June 6, 1939.    F. C. EASTMAN ET AL    2,160,846
LASTING MACHINE
Filed Oct. 19, 1937    14 Sheets-Sheet 6

INVENTORS
Fred C. Eastman
Arthur F. Pym
By their attorney
Victor Cobb

June 6, 1939. F. C. EASTMAN ET AL 2,160,846
LASTING MACHINE
Filed Oct. 19, 1937 14 Sheets-Sheet 7
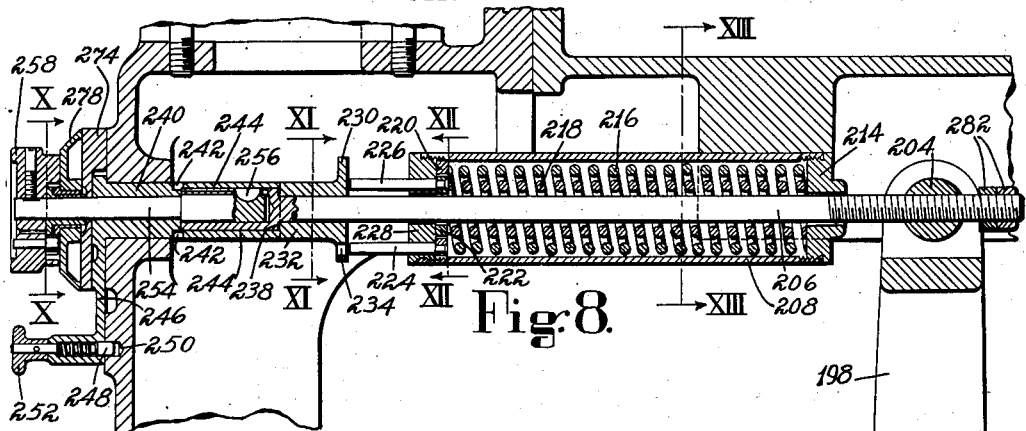
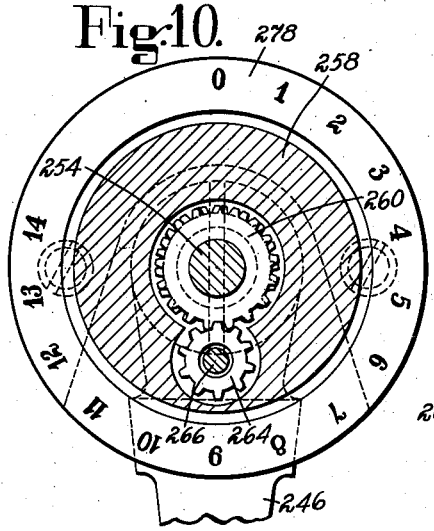
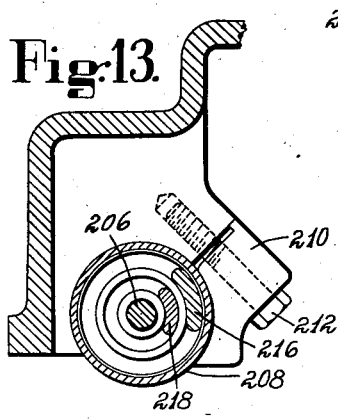
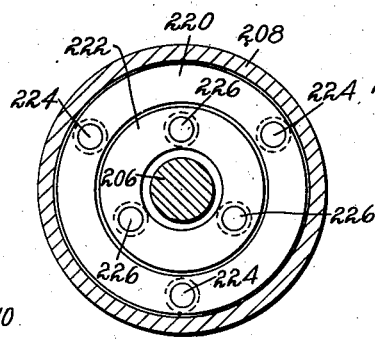
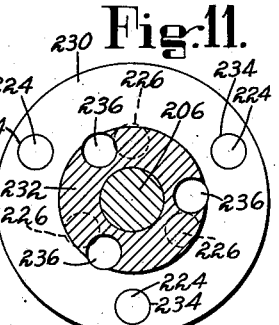
INVENTORS
Fred C. Eastman
Arthur F. Pym
By their Attorney
Victor Colb

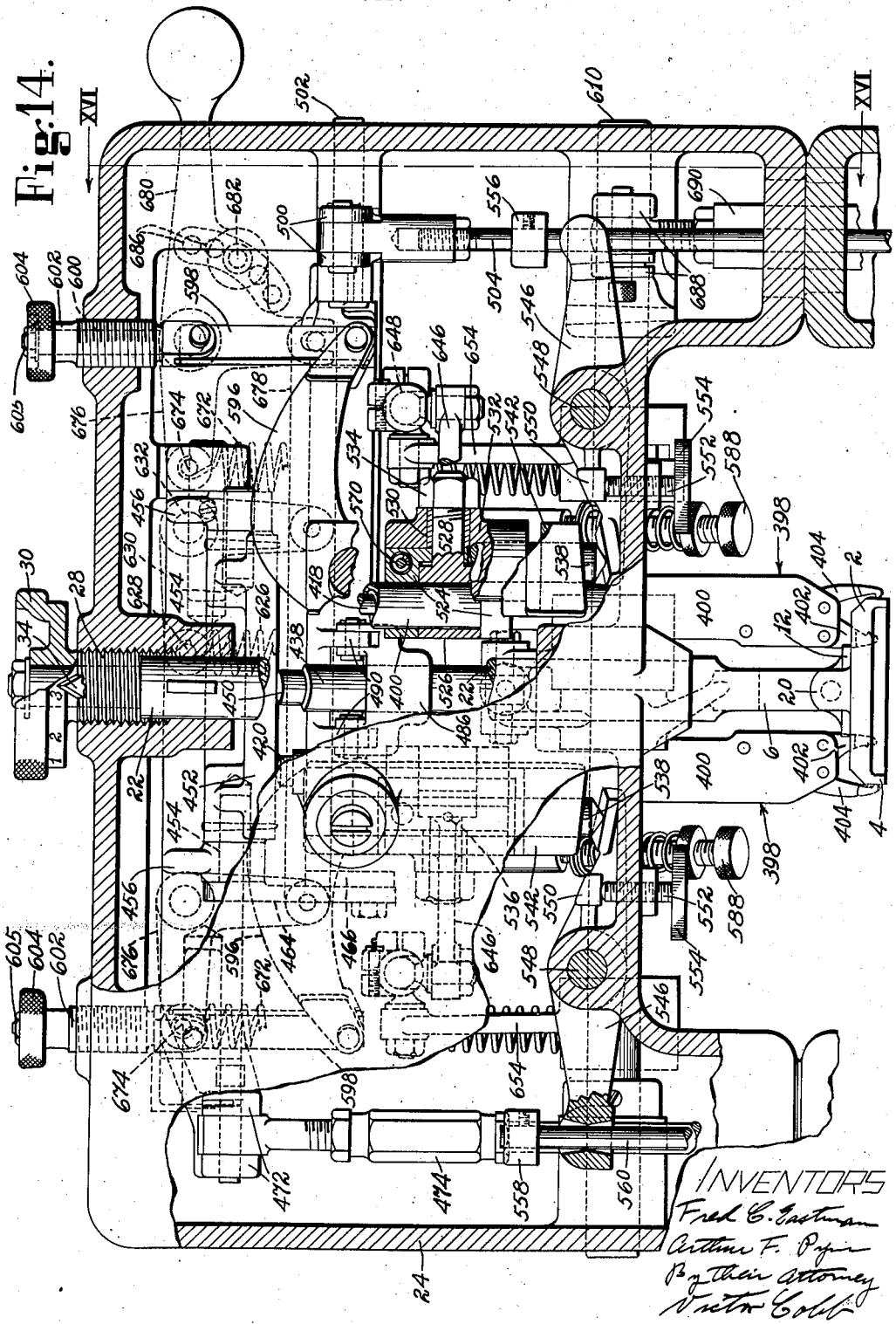

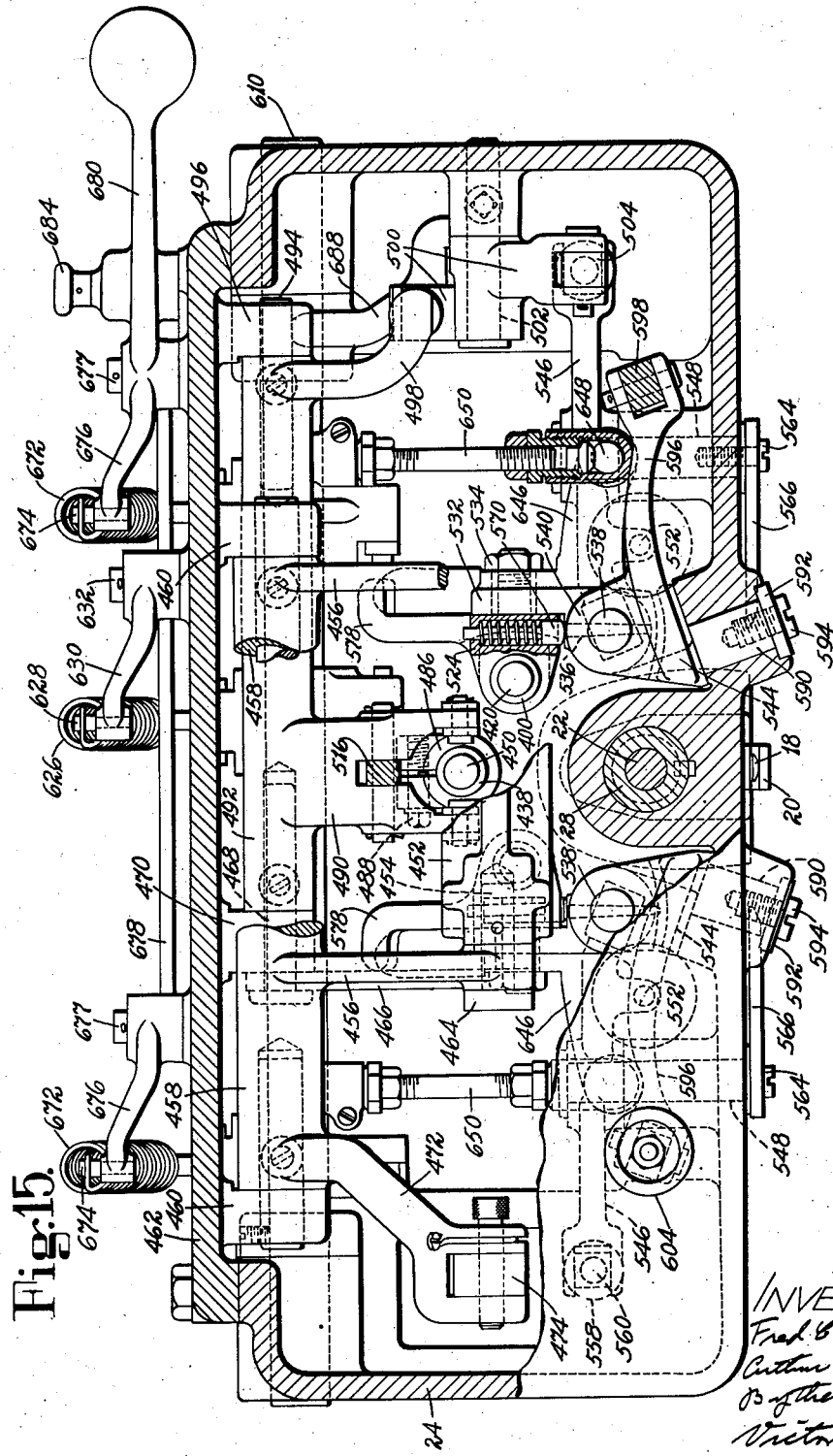

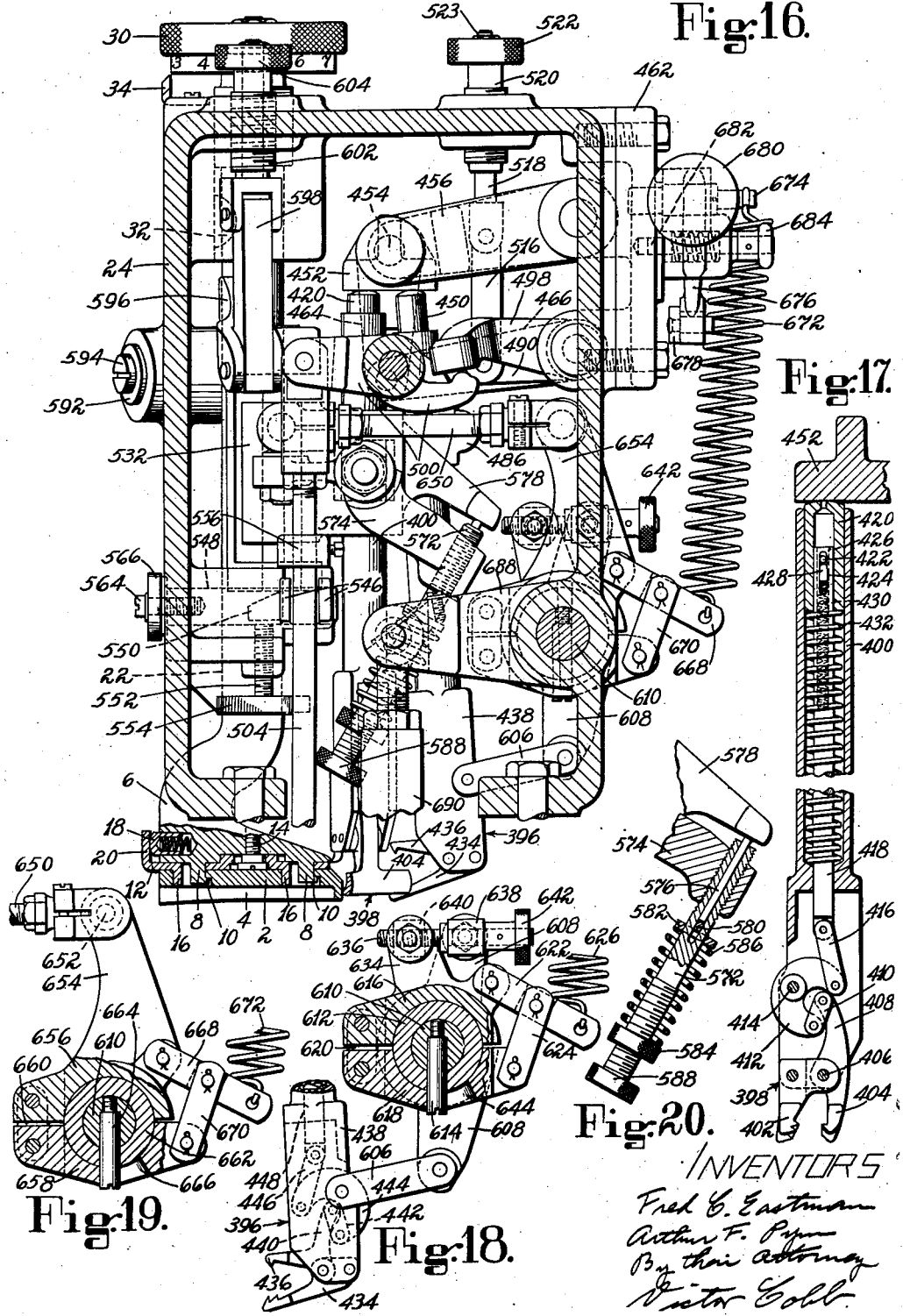

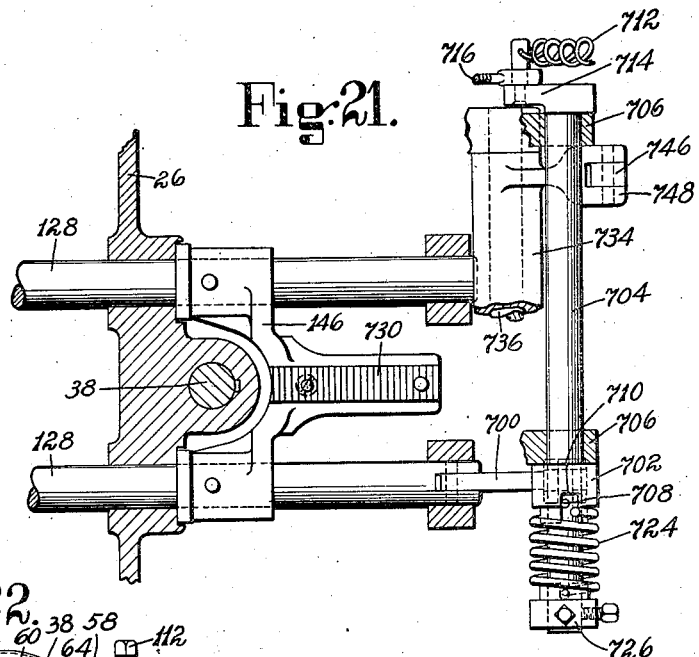
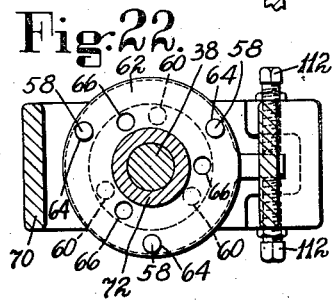
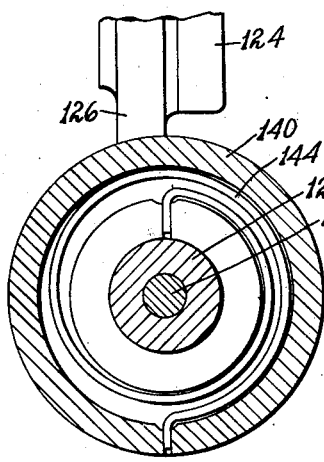
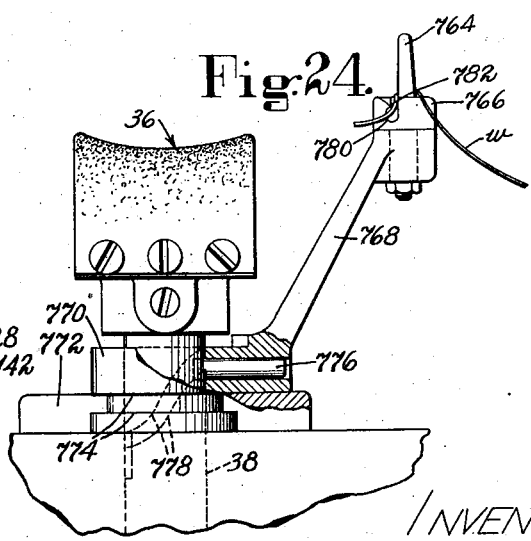

June 6, 1939.　　　F. C. EASTMAN ET AL　　　2,160,846
LASTING MACHINE
Filed Oct. 19, 1937　　14 Sheets-Sheet 12

INVENTORS
Fred C. Eastman
Arthur F. Pym
By their attorney
Victor Colt

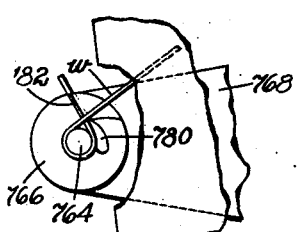
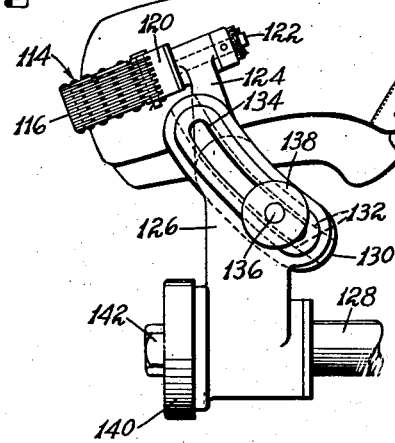
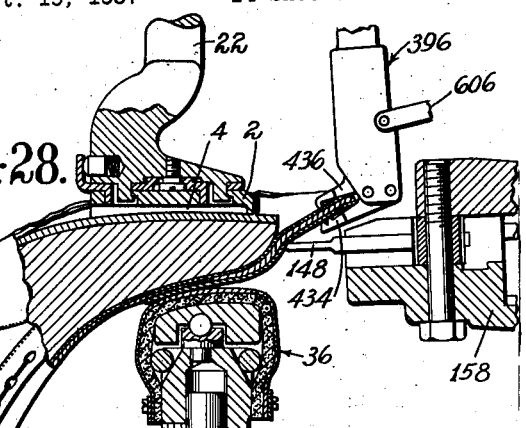
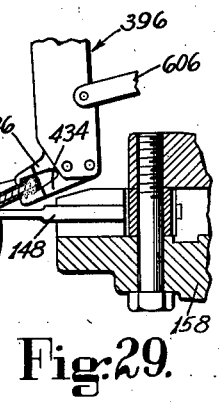
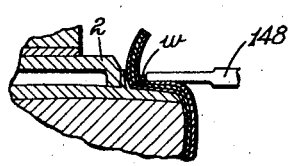
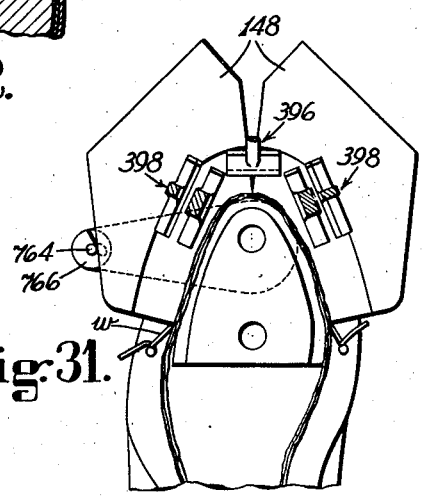

Patented June 6, 1939

2,160,846

UNITED STATES PATENT OFFICE 2,160,846

LASTING MACHINE

Fred C. Eastman, Marblehead, and Arthur F. Pym, Swampscott, Mass., assignors to United Shoe Machinery Corporation, Paterson, N. J., a corporation of New Jersey Application October 19, 1937, Serial No. 169,820

120 Claims. (Cl. 12—14)

This invention relates to lasting machines, and in various aspects more particularly to machines for lasting the toe ends of shoes. The invention is herein illustrated as embodied in a power-operated toe-lasting machine, and objects are to provide an improved organization of that character by the use of which toes will be lasted in a speedy manner with uniformly good results without the necessity for any great skill or effort on the part of the operator. The invention is further illustrated as applied to the lasting of welt shoes, but it will be understood that in various novel features it is not thus limited in its applicability nor limited to power-operated machines.

In one of its important aspects, the invention has more particularly in view improvements with reference to the fastening of the toe end of the upper in lasted position by use of a toe binder after the marginal portion of the upper has been wiped inwardly over an insole and against a lip or shoulder on the insole by toe-embracing wipers. In the use of the machine herein shown the operator himself applies binder wire about the toe and fastens it to the shoe, the wire, however, being forced firmly against the upper by the action of the wipers. In order to guard against loosening of the overwiped upper, and yet to facilitate the application of the wire about the toe, the machine is so controlled that it comes automatically to a stop when the wipers are at the limit of their overwiping movement in pressure-applying relation to the upper, but with the pressure of the wipers on the upper heightwise of the last somewhat decreased, so that the operator may at least begin to pull the wire inwardly between the wipers and the upper at the extreme edge of the shoe bottom while the machine is at rest. When the machine is again started this pressure is further decreased, so that the operator may pull the wire fully inward against the upstanding margin of the upper, the wipers are partially retracted while the operator continues to pull on the wire, and they are then again moved inwardly to force the wire firmly against the margin of the upper and are also operated to increase their pressure on the upper heightwise of the last. While the wire is thus held under pressure by the wipers the machine again comes to a stop to permit the operator, who has already anchored the wire to a tack at one side of the shoe bottom, to fasten it to a tack at the other side of the shoe bottom. Cooperating with the wipers to last the upper tightly and smoothly over the last and the insole is upper-gripping means which maintains a pull on the margin of the toe portion of the upper in the course of the inward wiping movement of the wipers, this upper-gripping means releasing its hold on the upper before the machine stops preparatory to the application of the wire about the toe, so that it will not tend to displace the wire by its pull on the upper when the wipers are thereafter partially retracted. In various respects the organization thus provided presents novel and useful features.

In accordance, further, with the manner of operation of the machine herein shown, the wipers are utilized to wipe the upper heightwise of the last (i. e., to perform an upwiping operation) before wiping it inwardly over the insole, and the upper-gripping means applies to the upper a pull outwardly over the wipers, i. e., a pull away from the last along the plane of the wipers, as well as a pull heightwise of the last. The invention provides for so timing the different operations as to render the outward pull fully effective in eliminating any wrinkles in the toe portion of the upper without the necessity for any great strain on the upper, the construction shown being such that this pull is substantially completed before the wipers begin to wipe the upper heightwise of the last, after which the pulling of the upper heightwise of the last takes place simultaneously with the wiping of the upper in that direction.

In accordance with another feature, the invention provides novel means for effecting and controlling the outward pull of the upper-gripping means on the upper. The machine herein shown is provided with three grippers which grip the upper respectively at the end and the sides or corners of the toe and are operated by springs to pull the upper outwardly over the wipers when permitted by mechanism which is movable to release them to the action of the springs, the grippers thereafter maintaining an outward pull yieldingly on the upper as it is wiped inwardly over the insole by the wipers. Associated also with the grippers are devices which by the frictional action of relatively movable parts serve first to increase the force of the pull of the grippers on the upper and thereafter, by reverse relative movement of the parts as the wipers wipe the upper inwardly, serve partially to counteract the force of the springs so that the upper will not be subjected to excessive tension in the overwiping operation. In the provision of such means for pulling the upper and controlling the force of the pull the invention, in its more general aspects, is not limited as to the number of the grippers or as to the direction of the pull on the upper.

Novelty is to be recognized also in various other features of the upper-pulling means. Opportunity is afforded, for example, for convenient adjustment of each gripper heightwise of the last by the provision of gripper-operating mechanism comprising normally disconnected parts one of which is freely movable toward or from the other in the adjustment of the gripper. The grippers which grip the upper at the sides or corners of the toe are, moreover, moved heightwise of the last to pull the upper by engagement with the lower ends of rods offset laterally from the grippers but connected to them and extending heightwise of the last, and the grippers are movable about the axes of these rods to apply to the upper an outward pull widthwise of the last. Combined with means for swinging the side grippers about these axes are means for preliminarily adjusting them about axes extending lengthwise of the last and also about other axes extending widthwise of the last for operating on uppers of different sizes. In accordance with another novel feature, the side grippers are controlled in such manner that they not only move reversely inward in converging paths in the wiping operation after pulling the upper outwardly over the wipers, but are also movable against yielding resistance in directions more nearly lengthwise of the last toward its heel end in response to pull of the upper thereon, so as to permit the marginal portion of the upper to assume more readily the position determined by the wipers without distortion by the grippers. The invention further provides novel means whereby the grippers in their upper-pulling movements are operatively independent of means for controlling the closing of their jaws, the construction shown being such that relative closing movement of the jaws of each gripper is effected by a spring in the gripper itself controlled by a member which is movable independently of the gripper-operating means to permit the closing of the jaws and thereafter to effect relative opening movement of the jaws. Novelty is to be recognized also in details of gripper construction. While grippers thus operated and controlled are utilized with special advantages in an organization including toe-lasting wipers, as herein shown, where provision for various operative movements and various adjustments of the grippers is particularly desirable, it will be evident that the novel features referred to are likewise applicable to other organizations.

The invention also provides novel means for controlling the pressure of wipers on an upper and for adjusting the wipers. In the construction herein shown the toe wipers are advanced lengthwise of the shoe by a lever mounted on a fulcrum support which is yieldable against the resistance of spring means in response to resistance of the upper to the movement of the wipers, and conveniently also the wipers are adjustable lengthwise of the shoe by movement of this fulcrum support.

To assist in controlling the shoe there is provided a heel rest which is movable by a spring lengthwise of the shoe into operative position and is automatically locked in that position, the heel rest comprising a flexible shoe-engaging band the ends of which are connected to spring-controlled arms mounted to swing toward each other about axes extending lengthwise of the shoe in response to pressure of the shoe on the band. The heel rest is returned to its idle position by mechanism including a spring which is yieldable to prevent injury to the operator if he should happen to be in the path of such movement of the heel rest. Novel features are also to be recognized in this part of the organization.

The invention still further provides novel means for forming a loop in an end portion of toe binder wire to be thereafter applied to a tack driven in the shoe. As illustrated, this loop-forming means comprises a device which receives and anchors an end of the wire and is movable bodily in an arc of substantially 180° to form the loop and present it in position to be removed from the device by the operator, the device being thus operated by movement of a shoe support member about which it swings.

The above and other features of the invention, including various novel details of construction and combinations of parts, will now be more particularly described with reference to the accompanying drawings and thereafter pointed out in the claims.

In the drawings,

Fig. 8 is a section on the line VIII—VIII of Fig. 4;

Fig. 9 is a similar section on an enlarged scale of a portion of the structure shown in Fig. 8;

Fig. 10 is a section on the line X—X of Fig. 8;

Fig. 11 is a section on the line XI—XI of Fig. 8;

Fig. 12 is a section on the line XII—XII of Fig. 8;

Fig. 13 is a section on the line XIII—XIII of Fig. 8;

Fig. 14 is a front view with parts broken away, showing on an enlarged scale the grippers and portions of their operating and controlling mechanisms;

Fig. 15 is a plan view with parts broken away, showing the same portions of the machine as Fig. 14;

Fig. 16 is a section on the line XVI—XVI of Fig. 14;

Fig. 17 is a vertical sectional view of one of the side grippers;

Fig. 18 shows a portion of the toe-end gripper in side elevation, with parts of its controlling mechanism in section;

Fig. 19 shows partly in side elevation and partly in section a portion of the mechanism for controlling one of the side grippers;

Fig. 20 shows partly in section another portion of the mechanism for controlling one of the side grippers;

Fig. 21 is a section on the line XXI—XXI of Fig. 3;

Fig. 22 is a section on the line XXII—XXII of Fig. 3;

Fig. 23 is a section on the line XXIII—XXIII of Fig. 3;

Fig. 24 shows in front elevation, with parts broken away, a toe rest with which the machine is provided and the means associated therewith for forming a loop at the end of the binder wire;

Fig. 27 is a plan view of a portion of the means for forming the loop in the binder wire as it appears after its movement to form the loop;

Fig. 28 is mainly a sectional view illustrating the relation of the toe-end gripper and the wipers to the shoe immediately prior to the upwiping movement of the wipers;

Fig. 29 is a view similar to a portion of Fig. 28, showing the parts as positioned at the end of the upwiping movement of the wipers;

Fig. 30 is a similar view showing the parts as positioned at the time when the machine first comes to a stop to permit the binder wire to be applied;

Fig. 31 is a plan view showing the wipers and the grippers as positioned after the machine has come to a stop the second time, the binder having been fastened to the shoe;

Fig. 32 is a sectional view with the parts in the same positions as in Fig. 31.

Figure 1:
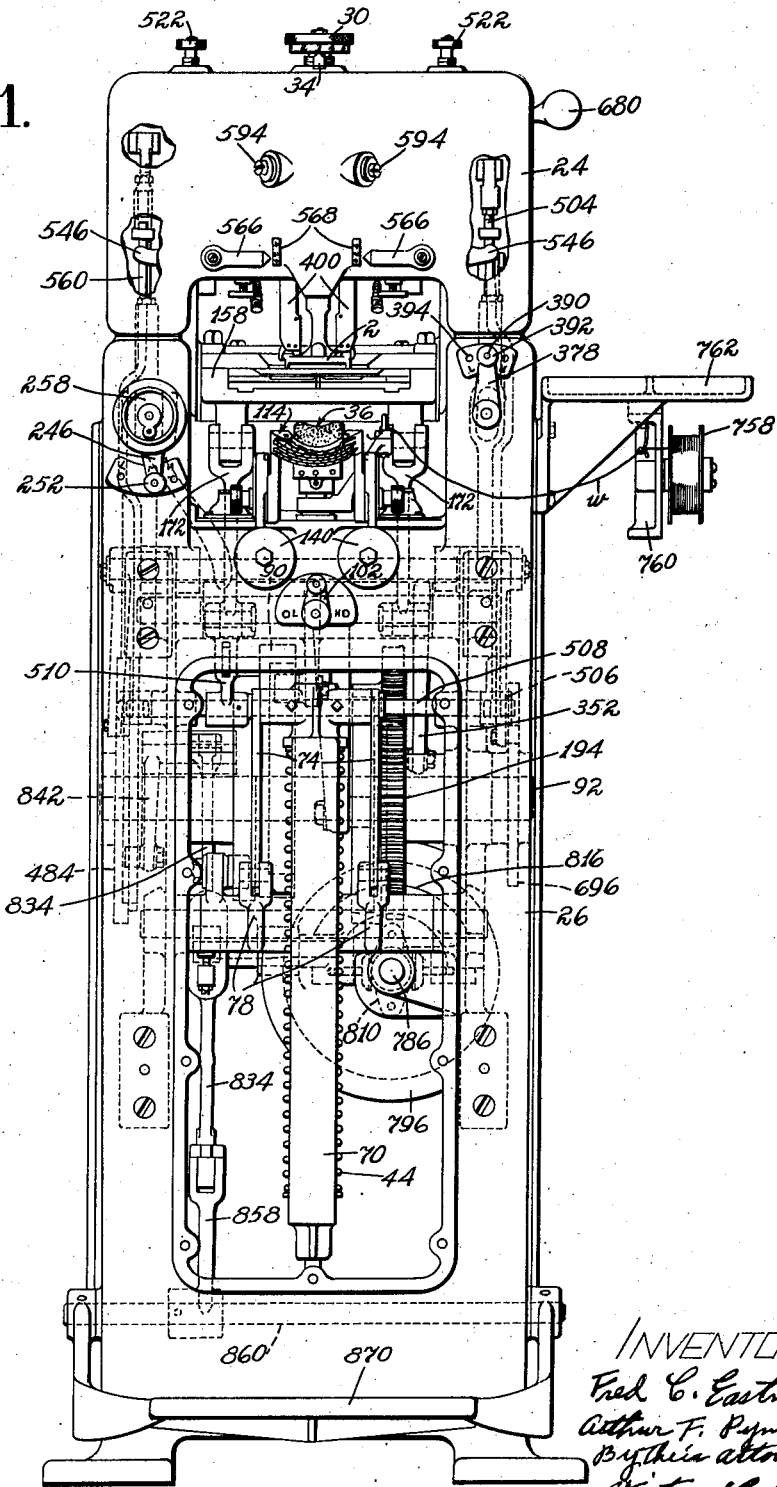
Fig. 1 is a view in front elevation of a machine in which the invention is embodied, with parts broken away.

The position of each shoe and its last in the toe-lasting operation is accurately determined by a plate 2 (Figs. 1 and 16) which, for welt shoe work, is herein shown as provided with a downwardly extending rim 4 so formed as substantially to fit the inner face of the lip of the insole around the toe, the lower edge of this rim being curved somewhat lengthwise of the shoe to conform to the curvature of the bottom of the forepart of the shoe when the latter has such a curvature. For properly positioning shoes which differ substantially as to size or style different plates will be required, and accordingly the plate 2 is readily detachable from a holder 6 on which it is supported. This holder has two projections 8 arranged to extend downwardly through openings in the plate 2 and provided with lips 10 which underlie lips on the plate to support the plate, as shown in Fig. 16. Mounted on the lower face of the holder 6 between the holder and the plate 2 is a slide 12 which is supported on the holder by a screw 14 with provision for limited movement of the slide relatively to the holder in directions lengthwise of the shoe. This slide also has openings to receive the projections 8 of the holder and is further provided with downwardly extending flanges 16 arranged to engage shoulders on the plate 2 in the openings in the plate. A spring-pressed plunger 18 in the holder 6 tends by engagement with a lug 20 on the slide 12 to move the slide forwardly, i. e., toward the operator's working position in front of the machine. Accordingly the plate 2 is normally held in interlocking relation to the lips 10 of the projections 8 by the flanges 16 of the slide 12. When it is desired to remove the plate 2 the operator moves the slide 12 rearwardly by pressing on the lug 20, thus permitting the plate to be readily detached from the projections 8. Another plate may then be substituted and will be locked in place when the operator releases the slide 12.

The holder 6 is formed on the lower end of a rod 22 adjustably movable vertically in bearings in a frame casting 24 fast on the top of the main frame 26 of the machine. At its upper end the rod 22 is reduced in diameter (Fig. 14) and has mounted to turn on its reduced portion an exteriorly threaded sleeve 28 provided with a hand wheel 30 for turning it, the threads on the sleeve engaging threads in the casting 24. Turning of the rod 22 is prevented by a key 32 (Fig. 16). Numerals on the hand wheel 30 indicate with reference to a pointer 34 on the casting 24 the position of the shoe-positioning plate 2 with respect to vertical adjustment. It will be understood that adjustment will be made in accordance with the character of the work on which the machine is to operate.

Figure 3:
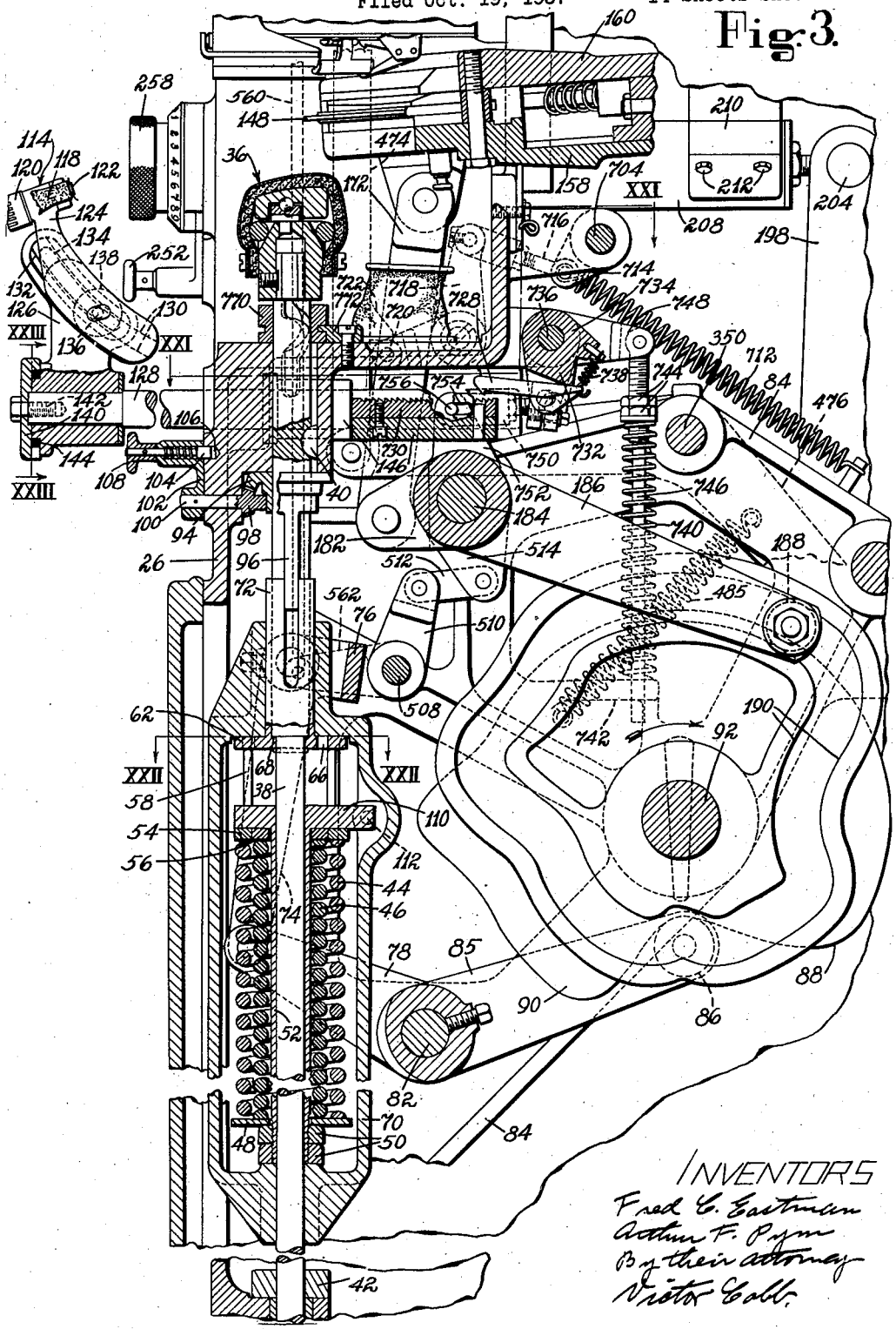
Fig. 3 is a view on an enlarged scale of a portion of the machine, partly in right-hand side elevation and partly in section.

The shoe is presented by the operator in the position determined by the plate 2 prior to the starting of the power operation of the machine, and immediately after the starting of the machine the shoe is clamped against the plate by a toe rest 36 (Fig. 3). This toe rest is herein shown as of the same construction as disclosed in United States Letters Patent No. 2,137,331, granted on November 22, 1938 on an application of P. E. Burby, and will therefore not be described in detail. It is fast on the reduced upper end of a rod 38 which is vertically movable in bearings in the frame 26 and is held from turning by a key 40. A collar 42 fast on the lower end of the rod serves by engagement with a shoulder on the frame to limit downward movement of the rod and the toe rest. Provision is afforded for applying the toe rest to the shoe with different degrees of force, in accordance with the character of the work, through the use selectively of one or the other or both of two springs 44 and 46 of which the spring 46 is the heavier. The lower ends of both these springs are supported on a washer 48 which rests on nuts 50 threaded on a sleeve 52, this sleeve being slidingly mounted on the rod 38. At their upper ends the springs 44 and 46 are in engagement respectively with rings 54 and 56 which are vertically movable independently of each other. The ring 54 has fast thereon three upwardly extending pins 58 (Fig. 22) and the ring 56 is similarly provided with three upwardly extending pins 60. Over the upper ends of these pins is a disk 62 provided with three holes 64 arranged to aline with the pins 58 when the disk is in one position and with three holes 66 arranged to aline with the pins 60 when the disk is in another position, the disk being rotatable about the rod 38 into one or the other of these two positions or into a third position in which neither of the two sets of holes is in alinement with the corresponding pins. It will thus be seen that upward movement may be imparted to the disk 62 through either of the two springs 44 or 46 selectively or through both springs combined by raising the sleeve 52 and its washer 48, and when the disk is thus raised it serves to raise the rod 38 and the toe rest 36 by reason of its engagement with a shoulder 68 at the lower end of an enlarged portion of the rod (Fig. 3). For raising the sleeve 52 there is provided a yoke 70 which bears slidingly on the rod 38 under the lower end of the sleeve, the upper end of this yoke being slidingly mounted on a sleeve 72 which is integral with the disk 62 and extends around the enlarged portion of the rod 38. Pivotally connected to the upper end of the yoke 70 are a pair of links 74 (Figs. 1 and 3) connected together by a web 76, the lower ends of these links being pivotally connected to forwardly extending arms 78 fast on a rock shaft 82 mounted in bearings in two spiders 84 fast on the frame 26. Also fast on this rock shaft is an arm 85 which carries a roll 86 engaged by a peripheral cam 88 formed on a cam member 90 fast on a cam shaft 92 mounted in bearings in the spiders 84.

It will thus be seen that the toe rest 36 is applied to the shoe by upward movement of the yoke 70 and that when the movement of the toe rest is stopped by the shoe continued upward movement of the yoke serves to compress one or the other or both of the springs 44 and 46, depending upon the adjusted position of the disk 62. The force with which the shoe is clamped against the plate 2 thus depends upon the position of the disk 62. For adjusting the disk there is rotatably mounted on the rod 38 a gear sector 94 extending downwardly from the hub of which are a pair of fingers 96 lying in vertical slots in the sleeve 72. The gear sector 94 is held against upward movement by engagement with a shoulder on the frame and is engaged and supported underneath by a pinion 98 formed integral with a shaft 100 mounted in a bearing in the frame. Fast on the forward end of this shaft is a crank arm 102 for turning it, this crank arm carrying a spring-pressed pin 104 arranged to enter any one of three holes 106 in the frame corresponding to the three adjusted positions of the disk 62. A knob 108 fast on the forward end of the pin 104 serves as means for withdrawing the pin from any of the holes and for swinging the crank arm 102. It will be understood that when the adjustment is such that one of the two springs 44 or 46 is to remain idle, the pins on the ring 54 or 56 controlled by that spring will register with and move idly upward in the corresponding holes in the disk 62 while the pins on the other ring abut against the disk. In order to maintain the two sets of pins in proper relation to each other they are all controlled by a disk 110 integral with the upper end of the sleeve 52, this disk having holes through which all the pins extend. The disk 110 is adjustably controlled by two set screws 112 threaded in the yoke 70 and arranged to bear respectively on opposite sides of a projection on the disk.

To assist in holding the shoe against lengthwise forward displacement there is further provided a heel rest 114 (Figs. 1, 2, 3 and 28) comprising a flexible chain 116 on which is mounted a layer 118 of felt or other suitable material to engage the heel end of the shoe, the chain and the layer of felt thus serving as a flexible heel band. The chain is supported at its ends on blocks 120 provided with pins 122 mounted to turn freely with the blocks and the ends of the chain about axes extending generally lengthwise of the shoe in the upper ends of a pair of brackets 124. The two brackets 124 are secured adjustably to arms 126 mounted to swing laterally of the shoe about the reduced forward ends of rods 128 which are movable lengthwise of the shoe in bearings in the frame. Each bracket 124 is provided with a tongue 130 curved about an axis extending laterally of the shoe and lying in a correspondingly curved guideway 132 in the arm 126, and extending from the bracket through a similarly curved slot 134 in the arm is a pin 136 on the end of which is threaded a nut 138 to clamp the bracket in adjusted relation to the arm. The axis of curvature of each tongue 130 and its guideway 132 is in the vicinity of the bottom of the forepart of the shoe, and in its adjustment the heel rest follows a path curved in general similarity to the heightwise curvature of the heel-end face of the shoe, the adjustment being made as required by shoes of different styles. The arms 126 are held on the rods 128 by caps 140 secured on the ends of the rods by screws 142, and mounted in an annular recess in the hub of each arm is a helical spring 144 (Figs. 3 and 23) one end of which is connected to the hub of the arm and the other end to the cap. The springs 144 tend to swing the arms 126 in directions away from each other and thus to straighten the heel band while permitting the band to wrap itself about the heel end of the shoe as it is applied to the shoe. The band is thus applied to the shoe by rearward movement of the rods 128 which are connected together in fixed relation to each other by a yoke 146 (Fig. 21). The means for operating the rods will be more conveniently described hereinafter in connection with the description of other parts.

Figure 4:
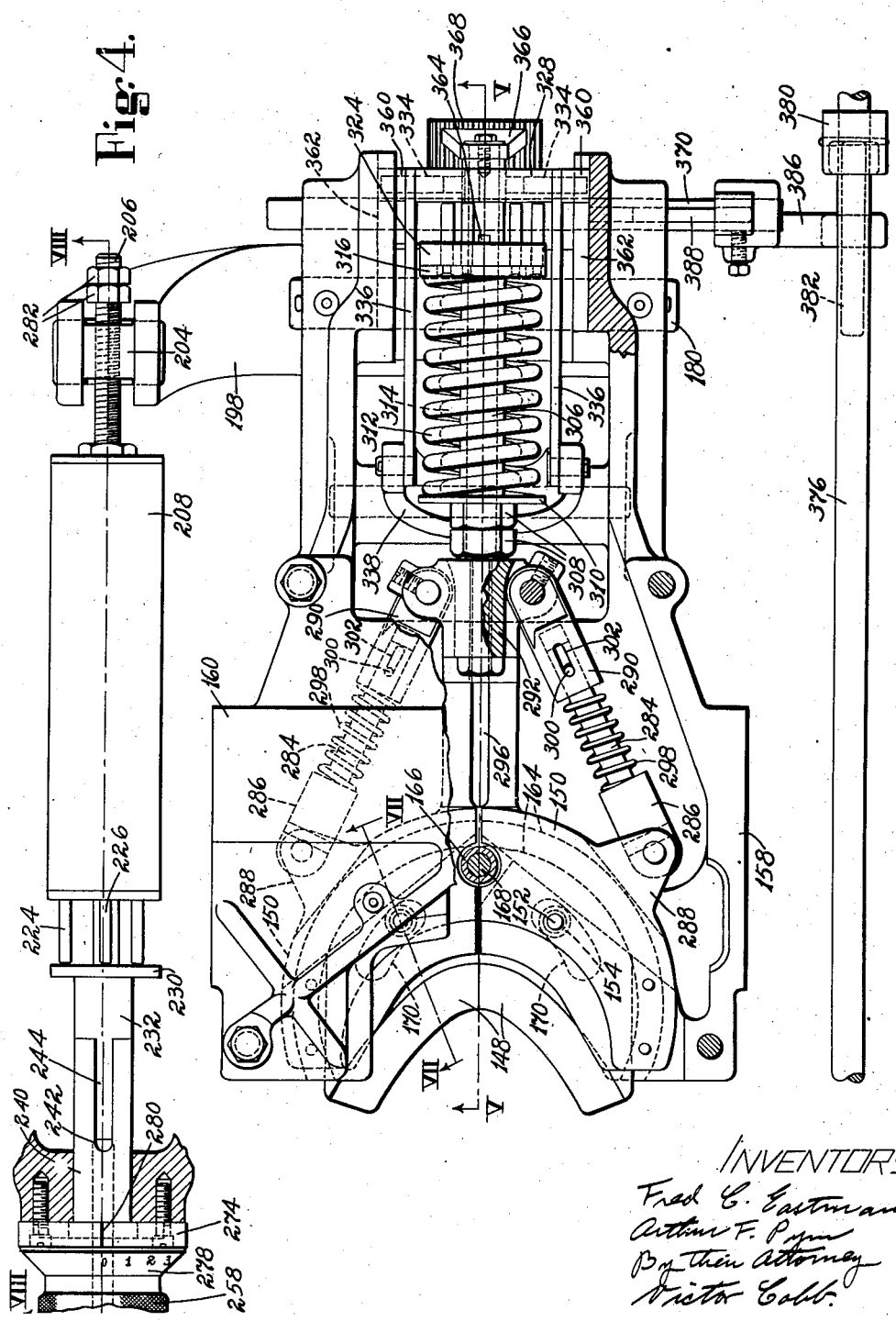
Fig. 4 is mainly a plan view of the toe wipers and their operating and controlling mechanism.
Figure 5:
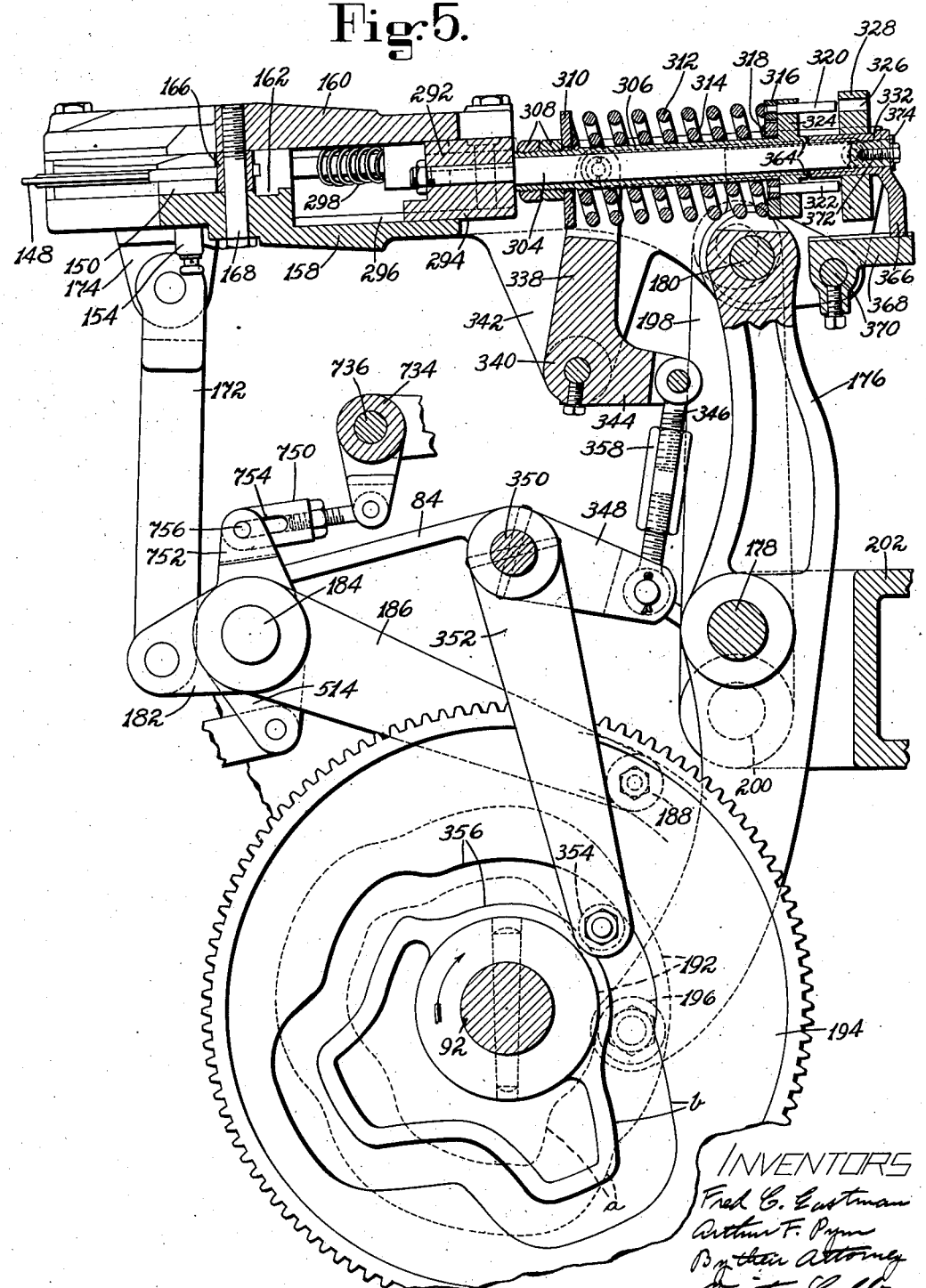
Fig. 5 shows the wiper-operating mechanism partly in right-hand side elevation and partly in section on the line V—V of Fig. 4.
Figure 7:
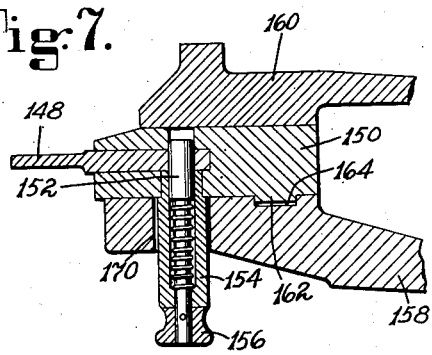
Fig. 7 is a section on the line VII—VII of Fig. 4.

For wiping the upper heightwise of the last and for wiping its marginal portion inwardly over the insole there are provided, as usual in toe-lasting machines, a pair of toe-embracing wipers 148 (Figs. 4, 5 and 7). These wipers are detachably mounted on wiper holders 150 in slots formed in the holders and are held in place by spring-pressed pins 152 which are mounted in nipples 154 fastened to the holders and enter holes in the wipers. The pins may be moved downwardly to release the wipers by means of knobs 156 on their lower ends. The wipers are so formed that they may be inverted in their holders for use on both right and left shoes. The wiper holders 150 are supported on a wiper carrier 158 under a cover plate 160 on the carrier and have depending curved ribs 162 which lie in a correspondingly curved guideway 164 in the wiper carrier. The wipers are thus guided for closing movements laterally of the shoe about an axis located substantially where their wiping edges meet. A sleeve 166 mounted on a bolt 168 extending through the wiper carrier and threaded in the cover plate assists in properly positioning the cover plate, the opposed faces of the wiper holders 150 having recesses therein to receive the sleeve. Slots 170 in the wiper carrier 158 provide room for movement of the nipples 154 with the wiper holders 150.

The wiper carrier 158 is supported for movements to advance and retract the wipers lengthwise of the shoe on a pair of links 172 (Figs. 1 and 5) spaced apart widthwise of the shoe and pivotally connected at their upper ends to lugs 174 on the carrier near the forward end of the latter, and also on the upper end of a lever 176 pivotally mounted between its upper and lower ends on a fulcrum 178 supported as hereinafter described. The upper arm of the lever 176 is pivotally connected by a rod 180 to the wiper carrier in a location substantially midway between the opposite sides of the carrier and, in effect, constitutes a link substantially parallel to the links 172. The two links 172 are pivotally connected at their lower ends to lever arms 182 fast on a rock shaft 184 mounted in bearings in the spiders 84, and also fast on this rock shaft is a lever arm 186 provided with a roll 188 which lies in a cam track 190 (Fig. 3) formed in one side of the previously mentioned cam member 90. Through this mechanism the wiper carrier 158 is swung upwardly about the rod 180 to cause the wipers to wipe the upper heightwise of the last and is later swung downwardly to increase the pressure of the wipers on the marginal portion of the upper over the insole. To advance and retract the wiper carrier and the wipers lengthwise of the shoe the lever 176 is swung about the rod 178 by a cam track 192 (Fig. 5) formed in one side of a gear wheel 194 through which the cam shaft 92 is operated as hereinafter described, the lever 176 carrying a roll 196 which lies in this cam track. It will be understood that when the wiper carrier is thus operated the links 172 swing idly about their pivotal connections with the arms 182.

Figure 6:
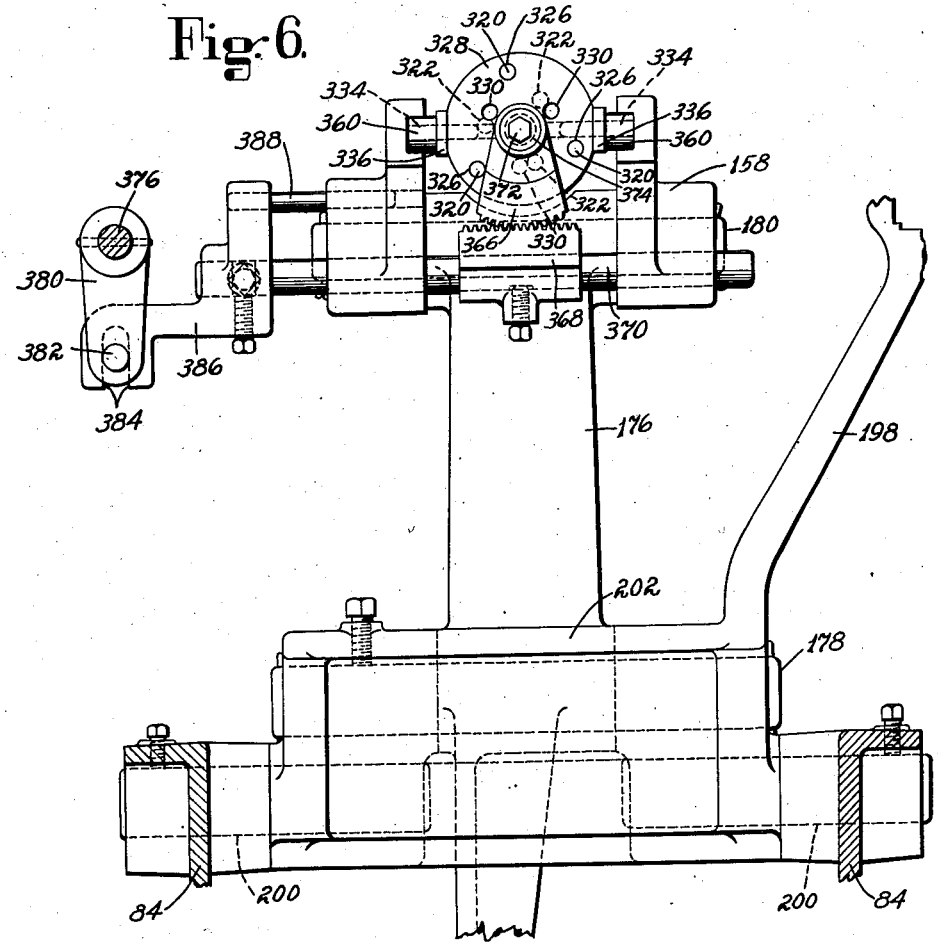
Fig. 6 show a portion of the wiper-operating and controlling mechanism in rear elevation.

To provide for yield in the advance of the wipers lengthwise of the shoe and also for adjustment of the wiper carrier 158 and the wipers in directions lengthwise of the shoe, the fulcrum rod or support 178 on which the lever 176 is mounted is supported by a lever arm 198 which is mounted to swing in directions lengthwise of the shoe on two short rods 200 (Fig. 6) fast in the spiders 84 and located below the rod 178, the arm 198 having a web 202 which connects two spaced hub portions thereof at opposite sides of the lever 176. Mounted to turn in the forked upper end of the arm 198 is a pin 204 (Figs. 4 and 8) in which is threaded the rear end of a rod 206 extending forwardly through a cylindrical casing 208. This casing is fastened rigidly to the frame of the machine by a clamp member 210 and screws 212 (Figs. 3 and 13) and has fast in its rear end a head 214 through which the rod 206 loosely extends. This head serves as an abutment against the rear ends of a pair of springs 216 and 218 in the casing 208, the spring 218 being heavier than the spring 216. At their forward ends these springs abut respectively against two rings 220 and 222 (Fig. 12). Fast on the ring 220 is a set of three pins 224 and fast on the ring 222 is a set of three pins 226, all these pins extending forwardly through holes in a head 228 secured in the forward end of the casing 208. In front of the pins is a disk 230 formed integral with a sleeve 232 mounted on the rod 206, the disk having therein holes 234 (Fig. 11) arranged to aline with the pins 224 when the disk is in one position and the disk and its sleeve being provided with holes 236 arranged to aline with the pins 226 when the disk is turned to another position around the rod 206. When the disk is in still another position all the holes are out of alignment with the pins. It will thus be seen that any rearward movement of the disk 230 will be yieldingly resisted by one or the other or both of the two springs 216 and 218, depending upon the adjusted position of the disk. At its front end the rod 206 is enlarged and bears against a shoulder 238 on the sleeve 232, and accordingly the disk 230 will be moved rearwardly by any movement of the rod 206 in that direction. The rod will be moved in that manner in response to resistance of the shoe to the bodily advancing movement of the wipers when that resistance becomes great enough to overcome the resistance of the spring or springs controlling the disk 230. That is, under those conditions the lever 176 will swung about the rod 180 which connects it to the wiper carrier 158, carrying the fulcrum rod 178, about which it normally swings, toward the rear while swinging the lever arm 198 in that direction to exert a rearward pull on the rod 206. Convenient means is thus provided to cause the wipers to press yieldingly on the upper lengthwise of the shoe with an amount of force which may be varied in accordance with the character of the upper materials.

For adjusting the disk 230 there is provided a cylindrical member 240 mounted to turn in a bearing in the frame and having a rearwardly extending sleeve portion (Fig. 4) arranged to fit over the enlarged front end portion of the rod 206 and provided with two slots 242 to receive fingers 244 extending forwardly from the sleeve 232 on which the disk 230 is formed. Accordingly the disk is turned by turning movement of the member 240, the interlocking connection between this member and the sleeve 232 permitting the disk to be moved rearwardly with the rod 206 in the manner previously described. Integral with the member 240 is a crank arm 246 for turning it, this crank arm carrying a spring-pressed pin 248 arranged to enter any one of three holes 250 in the frame to maintain the disk 230 in adjusted position. A knob 252 on the pin 248 provides means for withdrawing the pin from any one of the holes and for swinging the crank arm 246. It will be understood that when the disk 230 is in position for the holes 234 therein to aline with the pins 224, as shown in the drawings, only the spring 218 will be compressed by movement of the disk 230 resulting from resistance of the shoe to the forward movement of the wipers, the spring 216 remaining idle because of the fact that the pins 224 will enter the corresponding holes 234 in the disk. Similarly, when the disk is adjusted to a second position, only the spring 216 will be compressed, because the pins 226 will enter the corresponding holes 236, and when it is adjusted to a third position both springs will be compressed because all of the pins will be out of alinement with the holes in the disk.

The rod 206, through its threaded connection with the pin 204 in the lever arm 198, is further utilized by turning movement to adjust the wiper carrier 158 and the wipers in directions lengthwise of the shoe, such turning movement of the rod resulting in a forward or rearward swinging movement of the arm 198 and accordingly in a forward or rearward movement of the fulcrum rod 178 on which the lever 176 is mounted without altering the stress of either spring 216 or 218. For thus turning the rod 206 there is provided a shaft 254 mounted to turn in the member 240 and having an enlarged rear end portion extending into a bore in the enlarged front end portion of the rod 206, these parts being connected together by a key 256 for turning the rod 206 by the shaft 254 while permitting lengthwise movement of the rod relatively to the shaft. The enlarged portion of the shaft 254 abuts at its front end against the member 240 to prevent forward movement of the shaft. Fast on the front end of the shaft 254 is a hand wheel 258 for turning it. Associated with this hand wheel is mechanism, shown best in Figs. 9 and 10, for affording the operator an indication of the adjusted position of the wipers. This mechanism comprises two pinions 260 and 262 concentric with the shaft 254 and housed within a recess in the hand wheel 258, and a third pinion 264 also housed in this recess and mounted to turn about a pin 266 carried by the hand wheel, this pinion engaging both the pinions 260 and 262. The pinion 260 is integral with a sleeve 268 on the shaft 254, this sleeve having a pair of fingers 270 extending into a vertical slot 272 formed in a plate 274 which is fast on the frame of the machine and overlaps the front end of the member 240 to hold this member in place. Accordingly the pinion 260 is prevented from turning. The pinion 262 is integral with a sleeve 276 which surrounds the sleeve 268 and is fast in an opening formed in a disk member 278 mounted between the hand wheel 258 and the plate 274, this disk member and the pinion 262 being rotatable as a unit about the sleeve 268. The number of teeth on the pinion 262 is greater by one than the number of teeth on the pinion 260. In each revolution of the hand wheel 258, therefore, the pinion 262 and the disk member 278 are turned a definite distance relatively to the fixed pinion 260 by the action of the pinion 264. The disk member 278 has marked on a beveled face thereof a series of numerals arranged to register with a mark 280 (Fig. 4) on the plate 274, these numerals being so spaced from one another that the different numerals will be moved successively into registration with the mark 280 by successive revolutions of the hand wheel 258. The wipers will be adjusted to different positions to meet different conditions in the use of the machine on different kinds of shoes. To prevent the rod 206 from being accidentally moved too far in a forward direction there are provided check nuts 282 threaded on the rod at the rear of the pin 204 and normally spaced from the pin but arranged to engage it to limit turning of the rod.

Closing movements laterally of the shoe are imparted to the wipers through links comprising rods 284 (Fig. 4) having at their front ends enlarged heads 286 pivotally connected to lugs 288 on the wiper holders 150. The rods 284 are slidingly mounted at their rear ends in sockets formed in members 290 which are pivotally connected to a slide 292 movable in directions lengthwise of the shoe and having a tongue 294 (Fig. 5) mounted in a guideway 296 in the wiper carrier 158. Between the members 290 and the heads 286 of the rods 284 are light springs 298 arranged to yield in response to pressure of the shoe on the wipers in the upwiping operation and in response to resistance of the upper to the closing movements of the wipers as the wipers wipe the upper inwardly against the lip of the insole. The rods 284 carry pins 300 which extend into slots 302 in the members 290 and limit the yield of the springs 298, so that before the completion of the overwiping operation of the wipers the members 290 act positively on the rods 284. For operating the slide 292 to close the wipers there is provided a rod 304 (Fig. 5) the front end of which is reduced in diameter and secured to the slide, and mounted on this rod is a sleeve 306 having nuts 308 threaded thereon to provide an abutment for a washer 310. This washer is engaged by the front ends of two springs 312 and 314, of which the spring 314 is the stronger, the springs abutting respectively at their rear ends against rings 316 and 318. Secured to the ring 316 are three pins 320 (Fig. 6), and secured to the ring 318 are three pins 322, all these pins extending rearwardly through holes in a flange 324 integral with the sleeve 306 at the rear end of the sleeve. The pins 320 are arranged to aline with holes 326 in a disk 328 opposite the rear ends of the pins in one position of relative adjustment of the disk and the sleeve 306, and the pins 322 are arranged to aline with holes 330 in the disk in another position of relative adjustment of the disk and the sleeve. In still another position of relative adjustment of the parts all the pins are out of alinement with the holes in the disk. By forward movement of the disk 328, therefore, the wiper-closing slide 294 will be operated through either of the springs 312 or 314, or through both springs combined, depending upon the adjustment. The disk 328 is slidingly mounted on a sleeve 332 mounted on the rear end of the rod 304 and is connected by pins 334 (Fig. 6) to a pair of links 336 (Fig. 4) which are pivotally connected at their front ends to the bifurcated upper end of an upwardly extending arm 338 of a bell-crank lever 340 pivotally mounted on lugs 342 extending downwardly from the wiper carrier 158. The bell-crank lever 340 has a rearwardly extending arm 344 adjustably connected by a link 346 to an arm 348 fast on a rock shaft 350 mounted in bearings in the two spiders 84. Also fast on this rock shaft is an arm 352 provided at its lower end with a roll 354 lying in a cam track 356 formed in one side of the previously mentioned gear wheel 194. It will thus be seen that by operation of the bell-crank lever 340 the disk 328 is moved forwardly and operates through one or the other or both of the springs 312 and 314 to impart wiper-closing movement to the slide 292, the spring or springs being yieldable in the latter portion of the wiping operation after the springs 298 have ceased to yield. The link 346 comprises two short threaded rods connected by a turnbuckle 358 which may be used to adjust the wipers toward or from each other by swinging the wiper holders 150.

The pins 334 which connect the links 336 to the disk 328 have rolls 360 thereon which are movable along guideways 362 (Fig. 4) in the wiper carrier 158 to assist in supporting the rod 304 and the parts thereon. The disk 328, therefore, is prevented from turning, and the adjustment for rendering either or both the springs 312, 314 effective in the wiper-closing operation is made by turning the sleeve 306 and the parts supported thereon to vary the relation of the pins 320 and 322 to the holes in the disk. For this purpose the sleeve 306 has on its rear end two lugs 364 (Fig. 5) which extend into recesses in the sleeve 332 to lock these two sleeves together, and integral with the sleeve 332 is a gear sector 366 in engagement with a rack bar 368 (Fig. 6) fast on a rod 370 slidingly mounted in bearings in the wiper carrier 158. The sleeve 332 is held on the rod 304 by a screw 372 and a washer 374. For operating the rod 370 there is mounted in bearings in the front and rear portions of the frame a rock shaft 376 provided with a crank arm 378 (Figs. 1 and 2) on its front end and with a depending arm 380 (Figs. 4 and 6) fast thereon near its rear end, the arm 380 carrying a pin 382 which lies in a slot 384 in an arm 386 fast on one end of the rod 370. A pin 388 fast in the hub of the arm 386 is slidingly movable in a hole in the wiper carrier 158 to prevent the rod 370 from turning. It will thus be seen that adjustment of the sleeve 306 for the purpose described is effected through the crank arm 378 at the front of the machine. This crank arm carries a spring-pressed pin 390 controlled by means of a knob 392 thereon and arranged to enter any one of three holes 394 in the frame.

For applying a pull to the toe end of the upper to assist in lasting it tightly over the last and the insole the machine is provided with a gripper 396 (Fig. 16) arranged to grip the margin of the upper at the end of the toe and with two grippers 398 arranged to grip it respectively at the opposite sides of the toe in locations substantially at the corners of the toe. Each side gripper (Fig. 17) comprises a gripper casing 400 supported as hereinafter described and divided at its lower end to receive between spaced portions thereof a jaw 402 fixed to the casing and a jaw 404 pivoted at 406 on the casing, this jaw having an upwardly extending arm 408 connected by a link 410 to one end of a lever 412 of substantially semi-circular form which is pivotally mounted midway between its opposite ends on a pin 414 on the casing. The other end of the lever 412 is connected by a link 416 to a closing rod 418 on the upper end of which is slidingly mounted a plunger 420. This plunger carries a pin 422 which extends through slots 424 formed in the rod 418 at opposite sides of a central bore 426 in the rod. The pin 422 is held detachably in place by a detent 428 slidingly mounted in the bore 426 and having a rounded upper end which lies in an annular groove (not shown) in the pin, and also mounted in the bore 426 below the detent is a comparatively light spring 430 which tends to force the detent upwardly. Mounted in the casing 400 below the plunger 420 is a heavier spring 432. When permitted, this spring acts as a jaw-closing spring to swing the jaw 404 into position to grip the upper against the jaw 402 by moving the plunger 420 and the rod 418 upwardly in the casing 400, the pin 422 engaging the rod 418 at the upper ends of the slots 424. In this operation the force with which the upper is gripped is accentuated by the toggle action of the parts connecting the rod 418 to the jaw 404, the lever 412 being, in effect, a bell-crank lever one arm of which forms a toggle with the link 410. The jaws have teeth thereon for engaging the upper with an unslipping grip. The opening of the jaws is effected through the pin 422 and the spring 430 by pressure applied as hereinafter described to the upper end of the plunger 420, the spring 430 being yieldable to permit downward movement of the plunger relatively to the rod 418 when the jaws are fully open.

The toe-end gripper 396 is in most respects similar in construction to each of the side grippers, except that its jaws 434 and 436 (Fig. 18) are so formed and arranged that the opening between them is substantially horizontal, for convenience in inserting the margin of the upper therein, whereas the openings between the jaws of the side grippers are substantially vertical. The jaw 434 is fast on a gripper casing 438 on which the jaw 436 is pivotally mounted, this jaw having an arm 440 arranged in angular relation to its upper-gripping portion and connected by a link 442 to a lever 444 pivotally mounted on the casing and corresponding to the lever 412 of each side gripper. The lever 444 is connected by a link 446 to a jaw-closing rod 448 on the upper end of which is a plunger 450 (Fig. 16) like the plunger 420 of each side gripper. It will be understood that the toe-end gripper also includes a jaw-closing spring like the spring 432 of each side gripper and a light spring corresponding to the spring 430, together with parts like the parts 422 and 428 of the side gripper construction.

Figure 26:
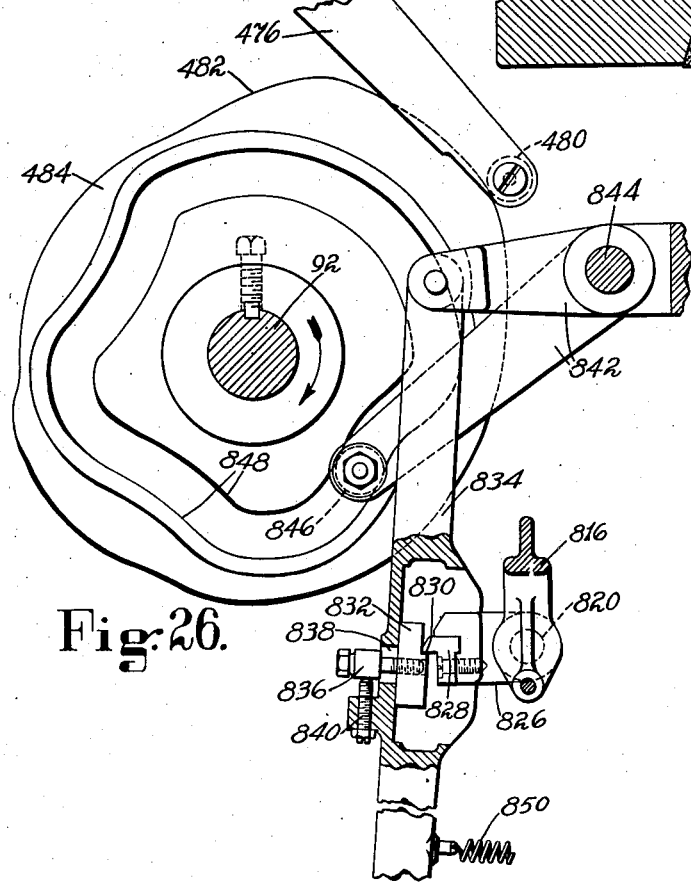
Fig. 26 is a view of a portion of the clutch controlling mechanism in side elevation, with parts broken away.

The opening of the end and side gripper jaws is effected through a plate 452 in engagement with the upper ends of the plungers 420 and 450. Fastened to this plate are two pins 454 (Figs. 14 and 15) whereby it is pivotally mounted on arms 456 which are integral with a bar 458 pivotally mounted on lugs 460 formed on a plate 462 fast on the frame casting 24. The plate 452 is held substantially horizontal at all times by means of a depending arm 464, integral with one of the pins 454, and a link 466 pivotally connected to the lower end of this arm and mounted to swing about a pin 468 (Fig. 15) in a lug 470 on the frame plate 462, the link 466 being parallel to the plate-supporting arm 456 above it. Integral with the bar 458 is an arm 472 connected by a link 474 (Figs. 3 and 14) to one arm of a lever 476 mounted to swing about the shaft 350, this lever carrying a roll 480 (Fig. 26) engaged by a peripheral cam 482 formed on a cam member 484 fast on the cam shaft 92. It will be understood that this cam acts to lower the plate 452 and thus to open the jaws of the several grippers and that when it permits the plate to rise the jaws are closed by the closing springs in the gripper casings. A spring 485 (Fig. 3) connected to the lever 476 holds the roll 480 at all times against the cam 482 and, when permitted by the cam, serves to lift the plate 452, the plate being lifted high enough to clear the plungers 420 and 450 even when the grippers are at the limit of their upper-pulling movements.

The toe-end gripper casing 438 is mounted in a split clamp 486 (Figs. 14 and 15) which is tightened about the casing by a screw 488, and the clamp is pivotally supported on the bifurcated front end of a lever arm 490 formed integral with a horizontal bar 492. One end of the bar 492 is fast on the previously mentioned pin 468 which is mounted to turn in the lug 470 on the plate 462, and the other end of the bar is fast on a pin 494 mounted to turn in a lug 496 also formed on the plate 462. Integral with the bar 492 is an arm 498 the front end of which overlies the rear arm of a lever 500 (Figs. 15 and 16) pivotally mounted between its ends on a pin 502 on the casting 24. The front arm of the lever 500 is connected by a link 504 to a lever arm 506 (Fig. 2) fast on a rock shaft 508 mounted in bearings in the spiders 84, and also fast on this rock shaft (Fig. 3) is an arm 510 connected by a link 512 to an arm 514 which is formed integral with the previously mentioned cam-operated lever 186 for imparting upwiping movement to the toe wipers. Such movement is imparted to the wipers by movement of the lever 186 in a clockwise direction (Fig. 3), and it will be seen that by that movement of the lever downward movement is imparted to the link 504 to swing the lever 500 (Fig. 16) in a counterclockwise direction and thus to lift the arm 498 to impart upper-pulling movement heightwise of the last to the toe-end gripper 396 in the course of the upwiping movement of the wipers. Pivotally connected to the arm 490 which supports the toe-end gripper is a link 516 (Figs. 15 and 16) the upper end of which is pivotally connected to the lower end of a vertically movable rod 518. Mounted to turn about this rod is a sleeve 520 which is exteriorly threaded for engagement with corresponding threads in the frame casting 24 and is provided with a knurled head 522 for turning it, this knurled head supporting the rod 518 by engaging a nut 523 on the upper end of the rod. It will thus be seen that by turning the sleeve 520 the rod 518 and the link 516 may be raised or lowered to adjust the toe-end gripper as desired in directions heightwise of the last. It will be understood that by this adjustment the arm 498 will be moved toward or from the rear end of the lever 500 by which the arm is operated.

Each of the side gripper casings 400 is securely clamped in a yoke 524 (Figs. 14 and 15) having upper and lower arms through openings in which the casing extends and between which is mounted a sleeve 526 extending around the casing, this sleeve having integral therewith a stem 528 which extends through an opening in the yoke 524 and through a sleeve 530 mounted in a bearing in a member 532. Threaded on the end of the stem 528 is a nut 534 which presses the sleeve 530 against the yoke 524 and at the same time acts through the stem 528 and the sleeve 526 to clamp the gripper casing 400 securely to the arms of the yoke. The yoke 524 and the sleeve 526 thus serve as a holder for the gripper, supported by the member 532. Secured by a pin 536 (Fig. 15) in a substantially cylindrical portion of the member 532 is a rod 538 the upper and lower end portions of which are slidingly mounted respectively in ears 540 and 542 (Figs. 14 and 15) formed on a bracket 544 supported on the frame casting 24 in a manner hereinafter described. The lower end of the rod 538 is supported on one arm of a lever 546 which is fast on a short rock shaft 548 mounted to turn in a bearing in the frame casting 24. In engagement with a lug 550 on this lever is the upper end of a screw 552 which is threaded in the casting 24 and has thereon a knurled head 554 for turning it. By turning this screw the side gripper may accordingly be adjusted preliminarily in directions heightwise of the shoe, the rod 538 sliding upwardly or downwardly in the ears 540 and 542. The lever 546 associated with the right-hand side gripper is operated to impart upper-pulling movement heightwise of the last to the gripper by a collar 556 fast on the previously mentioned link 504 through which the toe-end gripper is operated in the manner already described, this collar being adjustable to determine the time in the downward movement of the link when it engages and operates the lever 546. The lever 546 associated with the left-hand side gripper is similarly operated by a collar 558 adjustably fastened on the upper end of a link 560 which extends downwardly through an opening in the lever and is connected at its lower end (Fig. 3) to an arm 562 fast on the previously mentioned rock shaft 508 which carries the arm 506 (Fig. 2) for operating the link 504. It will be understood that as either side gripper is adjusted heightwise of the last by the screw 552, the lever 546 moves toward or from the collar 556 or 558 which operates it. Secured by a screw 564 on the front end of each rock shaft 548 is a short arm 566 which acts as a pointer with reference to a scale 568 (Fig. 1) on the frame casting 24 to indicate to the operator the amount of upper-pulling movement which each side gripper receives. This arm may be conveniently adjusted relatively to the scale after vertical adjustment of the gripper by the screw 552 and may then be fastened in adjusted position by tightening the screw 564.

Each side gripper 398 is movable in directions lengthwise of the shoe by swinging with the yoke 524 about the axis of the stem 528, the sleeve 530 turning with the stem in its bearing in the member 532. A spring-pressed plunger 570 (Fig. 15) mounted in the yoke 524 and bearing against that portion of the member 532 which extends around the rod 538 tends to swing the gripper in a direction to carry its jaws toward the heel end of the shoe. Cooperating with this plunger to determine adjustably the initial position of the gripper is a stem 572 (Figs. 16 and 20) which is threaded in an arm 574 integral with the member 532 and carries a spring-controlled pin 576 the upper end of which is in engagement with an arm 578 (Fig. 15) integral with the yoke 524. The pin 576 is slidingly mounted in the stem 572 and engages a crosspin 580 which extends through slots in the stem and bears against a washer 582. Between this washer and a nut 584 threaded on the stem is a spring 586 which is stronger than the spring which controls the plunger 570. The stem 572 has a knurled head 588 for turning it, and it will be evident that by such movement of the stem the side gripper may be variably positioned lengthwise of the shoe. The pin 576 and spring 586 serve additionally to permit the side gripper to swing yieldingly in a heelward direction in response to pull of the upper thereon as the upper is wiped inwardly over the insole by the wipers, thus permitting the margin of the upper more readily to assume the position determined by the wipers without distortion or undue wrinkling of the margin between the side gripper and the end gripper.

Each bracket 544, relatively to which the corresponding side gripper is movable heightwise of the last in the manner previously described, has integral therewith a stem 590 (Fig. 15) mounted to turn in a bearing in the casting 24 and held in place by a washer 592 and a screw 594 threaded in the stem. By swinging movement of the bracket about the axis of the stem the side gripper may accordingly be adjusted in directions widthwise of the shoe, the two stems extending lengthwise of the shoe and being arranged in an angular relation to each other corresponding generally to the angular relation of the opposite side faces of the toe end of a last. For effecting the adjustment each bracket 544 is provided with an arm 596 connected by a link 598 to the lower end of a rod 600 (Fig. 14) on which is swiveled a sleeve 602 threaded in the casting 24, the sleeve having a knurled head 604 for turning it and thereby adjusting the gripper inward or outward as may be required for shoes of different sizes. A nut 605 on the upper end of each rod 600 engages the knurled head 604 to support the rod.

In addition to the movements above described, there is also provision for swinging movements of the toe-end gripper 396 in directions lengthwise of the shoe about a horizontal axis located at the pivotal connections between the clamp 486 and the gripper-supporting arm 490, and for swinging movements of the side grippers 398 about axes extending heightwise of the shoe coincident with the axes of the rods 538, these rods turning in their bearings in the ears 540 and 542. As shown in Fig. 18, the toe-end gripper casing 438 is connected by a link 606 to the lower end of a lever 608 which is mounted between its opposite ends on a rock shaft 610, this shaft being mounted in bearings in the casting 24. The lever 608 is not fast on the shaft, but is connected thereto by friction means which permits the shaft to turn at times relatively to the lever. This friction means comprises a friction ring 612 connected to the shaft by a pin 614 to turn therewith, and a friction clamp comprising upper and lower halves 616 and 618 embracing the friction ring and connected together at one side of the shaft by a link 620. At the opposite side of the shaft a lever 622 is pivotally connected to the upper half 616 of the clamp and is connected midway between its opposite ends to the lower half 618 of the clamp by a link 624. Connected to the rear end of the lever 622 is a spring 626 which is connected at its upper end (Figs. 14 and 15) to a pin 628 fast on a substantially horizontal arm of a bell-crank lever 630 pivoted on a pin 632 on the previously mentioned plate 462. Integral with the upper half 616 of the friction clamp is an arm 634 connected to the upper end of the lever 608 by a spindle 636 which is swiveled in a block 638 pivotally mounted on the lever 608 and is threaded in a block 640 pivotally mounted on the arm 634. Fast on the spindle is a hand wheel 642 for turning it. By turning this spindle the lever 608 may be swung about the shaft 610 relatively to the arm 634 of the friction clamp to adjust the toe-end gripper in directions lengthwise of the shoe. It will be evident that the spring 626 tends both to tighten the friction clamp 616, 618 about the ring 612 and also to turn the clamp in a counterclockwise direction (Fig. 18) and thereby to swing the toe-end gripper in a rearward direction lengthwise of the shoe. The pin 614 extends through a slot 644 in the lower half 618 of the clamp and, with the parts positioned as shown in Fig. 18, prevents the turning of the clamp under the influence of the spring 626 and accordingly determines the initial position lengthwise of the shoe of the toe-end gripper. At a certain time in the cycle of operations, as more particularly hereinafter explained, the shaft 610 is turned in a counterclockwise direction, and thus not only permits the spring 626 to impart an upper-pulling movement lengthwise of the shoe to the end gripper by turning the friction clamp, but also adds to the force with which the gripper is thus operated by reason of the frictional engagement of the ring 612 with the clamp as the shaft turns relatively to the clamp. Later in the cycle, as also hereinafter explained, the shaft 610 is turned in a clockwise direction and thus causes the friction ring 612 by its action on the clamp partially to counteract the force of the spring 626 so that the pull of the gripper on the upper is not so great as it otherwise would be under the influence of the spring.

Mechanisms generally similar to that above described for operating and controlling the toe-end gripper are also provided for swinging the side grippers about the axes of the rods 538 and for controlling their swinging movements. Extending laterally from the member 532 associated with each side gripper is an arm 646 (Fig. 15) connected by a ball joint 648 to a link 650 which, as shown in Fig. 19, is connected at its rear end by a ball joint 652 to an arm 654 integral with the upper half 656 of a split clamp the lower half 658 of which is connected to the upper half by a link 660. This clamp embraces a friction ring 662 held on the shaft 610 by a pin 664 extending through a slot 666 in the lower half of the clamp. The upper and lower halves of the clamp are connected together by a lever 668 and a link 670, and the rear end of the lever is connected to a spring 672 the upper end of which (Figs. 14 and 15) is connected to a pin 674 fast on a substantially horizontal arm of a bell-crank lever 676 pivotally mounted on a pin 677 on the plate 462. It will thus be seen that when the shaft 610 is turned in a counterclockwise direction as previously described, it permits the two side grippers to be swung in outward directions away from each other about the axes of the rods 538 by the springs 672 and also adds frictionally to the force with which the springs act on the grippers, and that when the shaft is turned in the opposite direction later in the cycle it subtracts frictionally from the force with which the springs tend to swing the grippers outwardly. It will be evident by reference to Fig. 15 that the path of outward swinging movement of each side gripper is such that it has a component of movement lengthwise of the shoe as well as a component of movement widthwise of the shoe.

The bell-crank levers 630 and 676 have downwardly extending arms which are all pivotally connected to a crossbar 678, and one of the levers 676 has an arm 680 extending therefrom by the movement of which all three bell-crank levers may be operated to increase or decrease the tension of the springs 626 and 672. In this manner the force with which the several grippers are swung to apply an outward pull to the upper may be varied. The arm 680 carries a spring-pressed pin 682 having a knob 684 fast on its outer end and arranged to enter any one of a number of holes 686 provided in the plate 732 to retain the arm in adjusted position.

For turning the shaft 610 there is provided an arm 688 (Fig. 16) which is fast on the shaft and is connected by a link 690 to one arm of a bell-crank lever 692 (Fig. 2) mounted to turn on the shaft 350, the other arm of this bell-crank lever carrying a roll 694 engaged by the periphery of a cam 696 fast on the shaft 92. The roll is held at all times against the cam by a spring 698 connected to the bell-crank lever. It will be understood that the cam acts to turn the shaft 610 in a clockwise direction (Fig. 16) and that the spring turns it in the opposite direction when permitted by the cam. The cam, therefore, controls what may be termed spreading movements of the grippers.

Figure 2:
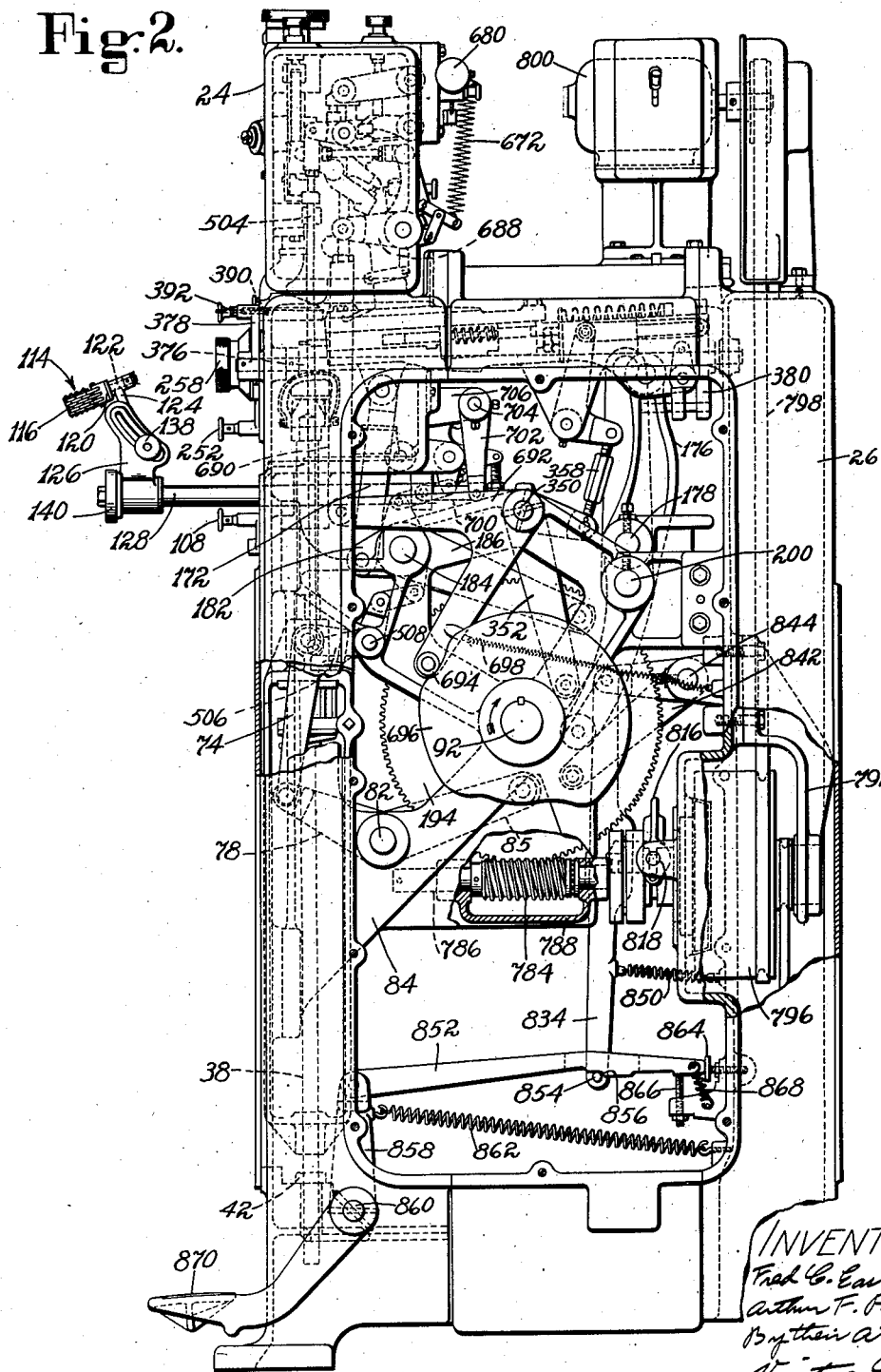
Fig. 2 shows the machine in right-hand side elevation, also with parts broken away.

The heel rest 114 has been described as supported on the rods 128 which are movable in bearings in the frame and are connected together by the yoke 146 (Fig. 21). These rods are moved rearwardly to apply the heel rest to the shoe by spring-operated mechanism controlled by the link 474 (Fig. 3) which, as previously described, is a part of the mechanism for opening the gripper jaws and for controlling their closing movements. As shown in Figs. 2 and 21, one of the rods 128 is connected by a link 700 to a lever arm 702 which is mounted on a rock shaft 704 rotatable in lugs 706 on the frame. The arm is not fast on the rock shaft, but is nevertheless swung thereby in the direction to impart rearward movement to the rods 128 through engagement of a pin 708 on the shaft with the hub of the arm in a slot 710 in the hub. The shaft is turned in the direction thus to operate the arm 702 by a spring 712 (Fig. 3) connected at one end to a pin on one of the spiders 84 and at the other end to an arm 714 on the shaft. For returning the heel band to its idle position the arm 714 is connected by a link 716 to one arm of a bell-crank lever 718 pivotally mounted on the frame, the other arm of this bell-crank lever being provided with a roll 720 arranged to be engaged by a lug 722 on the link 474. It will be understood that this link is moved upwardly to cause the gripper jaws to close, thus carrying the lug 722 away from the roll 720 to permit the heel band to be applied to the shoe by the action of the spring 712 as described. When the link is moved downwardly near the end of the cycle the heel band is returned by the action of the lug 722 on the roll 720. To guard against injury to the operator in case he should stand too near the machine when the heel band is thus returned, there is mounted on the rock shaft 704 a torsion spring 724 (Fig. 21) one end of which is connected to a collar 726 fast on the rock shaft and the other end to the hub of the arm 702 to provide a yieldable connection between the shaft and the arm.

To hold the heel band firmly against the shoe in the lasting operation there is provided a pawl 728 (Fig. 3) arranged to engage a ratchet plate 730 fast on the yoke 146. The pawl is pivotally mounted in a bifurcated portion of a pawl carrier 732 which is formed as part of a sleeve 734 (Fig. 21) mounted to turn on a rod 736 on the frame. A spring 738 on the pawl carrier tends to swing the pawl downwardly toward the ratchet teeth relatively to the carrier, such movement of the pawl being limited initially by engagement of the pawl with a portion of the pawl carrier, as shown in Fig. 3. The movement of the pawl into engagement with the ratchet teeth is effected by turning the pawl carrier, this being done by a spring 740 which is held compressed between an arm 742 on one of the spiders 84 and nuts 744 threaded on a rod 746 which extends through the spring and is connected at its upper end to an arm 748 integral with the sleeve 734. For swinging the pawl out of engagement with the ratchet teeth near the end of the cycle the pawl carrier 732 is connected by a link 750 (Figs. 3 and 5) to an arm 752 integral with the cam-operated lever 186 whereby upwiping movement is imparted to the toe wipers. To permit the pawl to be swung into engagement with the ratchet teeth by the spring 740, the link 750 is provided with a slot 754 into which extends a pin 756 carried by the arm 752. It will be understood that as the wipers are moved upwardly this pin moves toward the right (Fig. 5) thus releasing the pawl carrier 732 to the action of the spring 740.

Binder wire w to be applied to the shoe to hold the upper in lasted position is supported on a reel 758 (Fig. 1) which is mounted on a bracket 760 fastened to the lower side of a small table 762 fast on the right-hand side of the frame of the machine. At the proper time in the cycle of operations of the machine, as more particularly hereinafter described, the operator connects the end of the wire to a tack at the left-hand side of the shoe bottom and thereafter applies the wire to the upper around the toe, twists it around a tack at the right-hand side, and severs the portion of the wire applied to the shoe from the remainder of the wire. To facilitate connecting the wire to the left-hand tack, the machine is provided with means shown in Figs. 24 and 27 which acts automatically to form at the end of the wire a loop which the operator slips over the tack. This means comprises a pin 764 extending upwardly from a block 766 which is fast on the upper end of an upwardly extending inclined arm 768 having a hub portion 770 mounted to turn about the rod 38 which supports the toe rest 36. A U-shaped member 772 fastened to the top of the frame is provided with a flange which extends into a groove 774 in the hub 770 to prevent upward movement of the arm 768 while permitting it to swing about the rod 38. A pin 776 fast in the hub 770 extends into a spiral slot 778 formed in the rod 38, and by this means the arm 768 is swung through an arc of substantially 180° from a position at the right-hand side of the rod to a position at the left-hand side thereof when the rod 38 is moved upwardly to apply the toe rest to the shoe. Prior to the starting of the machine the operator applies the binder wire against the rear face of the pin 764 and inserts the end of the wire in a forwardly extending slot 780 formed in the block 766 adjacent to the pin, the end of the wire being retained in the slot by a sharp projection 782 on the block so that it is anchored in the slot. When the arm 768 thereafter receives its swinging movement it carries the block 766 bodily in an arc from one side of the toe support rod 38 to the opposite side thereof and thereby forms a loop at the end of the wire by bending the wire about the pin so that the main body of the wire extends across the portion in the slot 780 (Fig. 27). When the operator is ready to connect the wire to the tack at the left-hand side of the shoe he slips the end of the wire upwardly out of the slot 780 and bends it over the portion of the wire above it and then slips the loop off the pin 764 and slips it over the tack driven in the shoe. This relieves the operator of the necessity of twisting the end of the wire about the tack.

Figure 25:
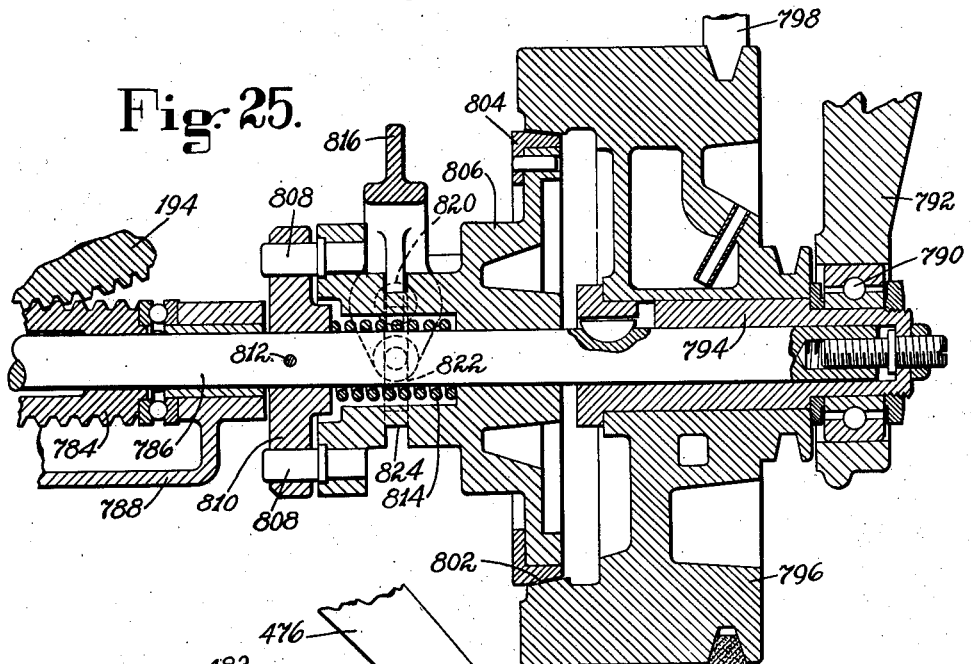
Fig. 25 shows the clutch and associated parts in vertical section.

The gear wheel 194 is driven by a worm 784 (Figs. 2 and 25) fast on a shaft 786 mounted in bearings in a bracket 788 on one of the spiders 84 and supported at its rear end by a ball bearing 790 in a bracket 792 fast on the frame. Keyed to the shaft 786 is a sleeve 794 on which is rotatably mounted a clutch drum 796 driven continuously through a belt 798 by an electric motor 800 supported on the top of the frame. The clutch drum 796 has a friction face 802 arranged to be engaged by a friction ring 804 fast on a cooperating clutch member 806 which is slidable lengthwise of the shaft 786 but is connected to the shaft to turn therewith by two pins 808 fast in the member 806 and slidable in openings formed in a member 810 secured to the shaft by a pin 812. A spring 814 mounted in an annular recess in the clutch member 806 and bearing against the member 810 tends to move the member 806 into position to be driven by the clutch drum 796. The member 806 is controlled by a yoke 816 one arm of which is fast on a short shaft 818 (Fig. 2) mounted to turn in a lug on the frame and the other end of which is fast on a shaft 820 (Figs. 25 and 26) mounted to turn in another support on the frame. Pivotally connected to the lower ends of the arms of the yoke 816 are two shoes 822 lying in a groove 824 in the clutch member 806. Fast on the shaft 820 is an arm 826 (Fig. 26) on the end of which is secured a latch 828 which is normally engaged underneath by a shoulder 830 on a block 832 to hold the yoke 816 in such a position that the clutch member 806 is disconnected from the clutch drum 796. The block 832 is carried by a lever 834 to which it is clamped by a screw 836 extending through a slot 838 in the lever, the block being adjustable upwardly or downwardly as determined by a screw 840 engaging the lower side of the screw 836. The lever 834 is pivotally mounted at its upper end on one arm of a bell-crank lever 842 pivoted at 844 to a lug on the frame, the other arm of this bell-crank lever carrying a roll 846 which lies in a cam track 848 formed in one side of the previously mentioned cam member 484. A spring 850 tends to swing the lever 834 in a rearward direction and thus to hold the shoulder 830 under the latch 828. The lower end of the lever 834 extends through a slot formed in a substantially horizontal bar 852 (Fig. 2) and below the bar carries a pin 854 arranged to engage a shoulder 856 on the bar. The bar 852 is pivotally connected at its front end to an upwardly extending arm 858 fast on a rock shaft 860 mounted in bearings in the frame, and a spring 862 connected to this arm tends to swing it in a rearward direction and thus to hold the rear end of the bar 852 against the head of a screw 864 which is threaded in the frame and is adjustable to determine the normal position of the bar. The rear end of the bar is supported adjustably on the upper end of a screw 866 threaded in a lug on the frame and is held down on this screw by a spring 868. Fast on the rock shaft 860 is a treadle 870. It will thus be seen that when the treadle 870 is depressed the bar 852 is moved in a forward direction and acts on the pin 854 to swing the lever 834 forwardly and thus to disconnect the block 832 from the latch 830. This permits the spring 814 to force the clutch member 806 into position to be driven by the drum 796. For bringing the machine thereafter to a stop the lever 834 is lowered by the action of the cam track 848 on the bell-crank lever 842, thus disengaging the pin 854 from the shoulder 856 if the operator has not released the treadle 870 and permitting the lever to be swung by the spring 850 to carry the shoulder 830 of the block 832 again below the latch 828, after which the lever 834 is lifted to swing the yoke 816 in the direction to disconnect the clutch members from each other. As more particularly hereinafter described, the cam track is so formed as to bring the machine to a stop twice in the cycle of operations before it is finally brought to a stop at the end of the cycle.

Figure 33:
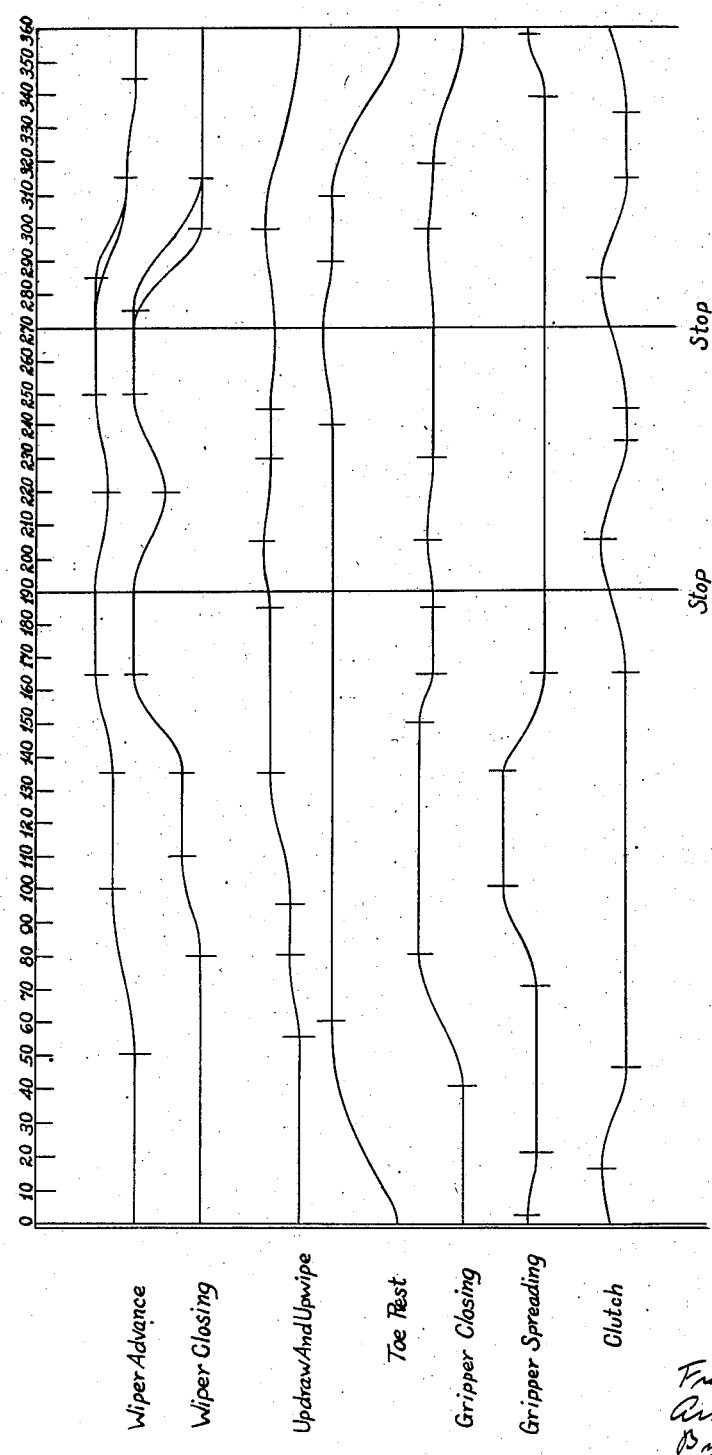
Fig. 33 is a chart illustrating the time relation of the movements of the different operating instrumentalities.

In the use of the machine, the operator presents a shoe with its insole in proper relation to the shoe-positioning plate 2 and inserts the margin of the toe end of the upper materials between the open jaws of the toe and side grippers. Usually such a shoe, in accordance with the customary practice, will have been previously pulled over and side lasted, and before presenting the shoe the operator removes the end pulling-over tack and at least the foremost of the side pulling-over tacks. After the shoe has been properly presented the operator starts the machine by depressing the treadle 870. At the beginning of the power operation, as illustrated by the chart (Fig. 33), the toe rest 36 is moved upwardly to clamp the shoe against the plate 2, and as the toe rest is thus raised the loop-forming arm 768 is swung rearwardly and to the left about the toe rest rod 38 to form a loop at the end of the toe binder wire in the manner previously described and to present the loop in position to be conveniently removed from the arm by the operator. For convenience in inserting the margin of the upper in the end gripper jaws, this gripper is positioned initially somewhat farther rearwardly of the plate 2 than is desirable when its jaws grip the upper, and accordingly the end gripper receives a short forward or inward swinging movement from the cam 696 (Fig. 2) as the machine starts to operate, as indicated by the "gripper spreading" line on the chart, the side grippers also incidentally receiving corresponding inward swinging movements since they are controlled by the same cam. Thereafter, the end and side gripper jaws are closed on the upper by the springs in the gripper casings under control of the cam 482 (Fig. 26), the plate 452 (Fig. 16) being lifted to release the plungers 420 and 450, and at the same time the heel band 14 is applied to the shoe by rearward movement of the rods 128 since it is controlled also by the cam 482. As soon as the jaws have gripped the upper the toe-end gripper is swung rearwardly to pull the upper lengthwise of the last, as illustrated in Fig. 28, and the side grippers are swung outwardly about the axes of the rods 538 with a pulling action on the upper, these spreading movements of the end and side grippers being effected by the springs 626 and 672 (Figs. 18 and 19) as permitted by the turning of the shaft 610 under control of the cam 696, and the force of the pull on the upper being increased by the turning of the friction rings 612 and 662 with the shaft 610. At approximately the same time, the toe wipers are raised a short distance by upward swinging movement of the wiper carrier 158 and are also advanced and closed about the toe preparatory to the upwiping operation, the closing of the wipers being delayed until near the end of their advancing movement to avoid any objectionable rubbing action of their edges on the upper along the sides of the toe. These movements of the wipers are merely positioning movements prior to the upwipe, and although the same cam 190 (Fig. 3) which swings the wiper carrier upwardly acts to raise the grippers, but little, if any, such movement is imparted to the grippers at this time by reason of the initial spacing of the lever 500 from the arm 498 (Fig. 16) and of the levers 546 from the collars 556 and 558 (Fig. 14). When the outward swinging or spreading movements of the grippers have been substantially completed, the wiper carrier 158 is swung upwardly to effect the upwiping action of the wipers and to carry them into position to wipe the margin of the upper inwardly over the insole, as illustrated in Fig. 29, the several grippers at the same time being moved upwardly to pull the upper heightwise of the last. In this operation the pawl 728 (Fig. 3) is rendered effective to lock the heel rest in shoe-supporting position. The wipers are next further advanced and closed to wipe the upper inwardly over the feather of the insole and against the lip which is supported on its inner side against the pressure of the wipers by the plate 2. As the wipers are thus operated the end and side grippers are swung reversely inward by the pull of the margin of the upper thereon, the strain on the upper, however, being lessened by reverse turning movement of the shaft 610 and its friction rings 612 and 662 which partially counteract the force of the gripper-spreading springs. It will be evident that the side grippers are thus swung inwardly about the axes of the rods 538 in converging paths with components of movement lengthwise of the shoe as well as widthwise of the shoe, and additionally they may be swung in heelward directions more nearly lengthwise of the shoe in response to the pull of the margin of the upper thereon, against the resistance of the springs 586 (Fig. 20), to avoid distortion or undue wrinkling of the margin of the upper, as previously explained. Near the end of the overwiping movement of the wipers the grippers, which have maintained an unslipping grip on the margin of the upper, are opened enough to release the upper, the shaft 610 having been turned far enough to cause the pins 614 and 664 to prevent the grippers from swinging outwardly at this time. Shortly thereafter the machine comes automatically to a stop, the wipers, however, first being raised slightly to decrease their downward pressure on the upper.

While the machine is at rest at the end of the first stage of the cycle, with the parts positioned as shown in Fig. 30, the operator slips the end of the binder wire out of the slot 780 in the looper block 766 now positioned at the left-hand side of the toe rest rod 38, bends this end over the portion of the wire above it and then slips the formed wire loop off the pin 764 and slips the loop over a tack at the left-hand side of the shoe bottom, which may be one of the pulling-over tacks remaining in the shoe or may be a tack which the operator drives after the machine has come to a stop. By pulling on the wire at the right-hand side of the shoe the operator then draws it about the toe and at least starts it inwardly between the wipers and the upper at the extreme edge of the shoe bottom (Fig. 30), as permitted by the decrease in the downward pressure of the wipers prior to the stopping of the machine. While continuing thus to pull on the wire, the operator starts the machine again. Thereupon the wipers are further raised a short distance to permit the wire to be pulled tightly in against the upstanding margin of the upper, and they are also partially retracted and opened. While the operator continues his pull on the wire the wipers are again advanced and closed to force the wire firmly against the upstanding margin of the upper and are also moved downwardly to increase their pressure on the upper, the wipers thereafter receiving still further downward upper-pressing movement simultaneously with an increase in the compression of the spring or springs through which the toe rest is forced against the shoe. At this point the machine again comes automatically to a stop, with the wipers positioned as illustrated in Figs. 31 and 32, after which the operator twists the wire around a tack at the right-hand side of the shoe bottom and severs the portion of the wire thus applied to the shoe from the remainder of the wire. He then starts the machine again to cause the parts to be returned to their starting positions. Before the wipers are retracted from over the shoe bottom they are raised to relieve their downward pressure on the upper. As indicated by the chart (Fig. 33), and as shown in Fig. 5, the cam tracks 192 and 356 by the action of which the advancing and closing movements of the wipers are respectively effected are somewhat widened, as shown at $a$ and $b$, respectively, to permit at this time a quick expansion of the spring or springs (Fig. 4) through which the wipers are closed and a quick expansion also of the spring or springs (Fig. 8) which yield in the advance of the wipers lengthwise of the shoe, so as to relieve the inward pressure of the wipers against the margin of the upper when they are raised. After removing the shoe from the machine the operator again applies the end of the binder wire to the loop-forming device before presenting another shoe to the machine.

The means herein disclosed for utilizing one or the other or both of two springs selectively for purposes of yieldable power transmission or resistance, as shown in Figs. 3, 5 and 8, is not claimed per se in this application, since this is an invention of Arthur F. Pym and Philip E. Burby covered by United States Letters Patent No. 2,143,030, granted on January 10, 1939.

Having described the invention, what we claim as new and desire to secure by Letters Patent of the United States is:

1. In a power-operated lasting machine, wipers for embracing an upper about the toe end of a last, power-operated means for imparting to said wipers an overwiping movement to wipe the marginal portion of the upper inwardly over an insole on the last and against a lip or shoulder on the insole and another overwiping movement thereafter to force a binder wire against the upstanding margin of the upper, and automatic means for bringing the machine to a stop after said first-mentioned overwiping movement of the wipers to permit the operator to apply binder wire about the toe and again after the wipers have forced the wire against the upper and while they are in pressure-applying relation to the wire to permit the operator to fasten the wire to the shoe.

2. In a power-operated lasting machine, wipers for embracing an upper about the toe end of a last, power-operated means for imparting to said wipers an overwiping movement to wipe the marginal portion of the upper inwardly over an insole on the last and against a lip or shoulder on the insole and another overwiping movement thereafter to force a binder wire against the upstanding margin of the upper, automatic means for bringing the machine to a stop when the wipers are at the limit of said first-mentioned overwiping movement to permit the operator to apply binder wire about the toe and again after the wipers have forced the wire against the upper and while they are in pressure-applying relation to the wire to permit the operator to fasten the wire to the shoe, and means for effecting a decrease of the pressure of the wipers on the upper heightwise of the last prior to said first-mentioned stop in the operation of the machine.

3. In a power-operated lasting machine, wipers for embracing an upper about the toe end of a last, power-operated means for imparting to said wipers an overwiping movement to wipe the marginal portion of the upper inwardly over an insole on the last and against a lip or shoulder on the insole and another overwiping movement thereafter to force a binder wire against the upstanding margin of the upper, automatic means for bringing the machine to a stop after said first-mentioned overwiping movement of the wipers while they are in pressure-applying relation to the upper to permit the operator to apply binder wire about the toe and again after the wipers have forced the wire against the upper and while they are in pressure-applying relation to the wire to permit the operator to fasten the wire to the shoe, and means for effecting between said two stops in the operation of the machine first a decrease of the pressure of the wipers on the upper heightwise of the last to facilitate tightening of the wire about the margin of the upper and thereafter an increase in said pressure.

4. In a power-operated lasting machine, wipers for embracing an upper about the toe end of a last, power-operated means for imparting to said wipers overwiping movement to wipe the marginal portion of the upper inwardly over an insole on the last and against a lip or shoulder on the insole, automatic means for bringing the machine to a stop after said overwiping movement of the wipers while they are in pressure-applying relation to the upper to permit the operator to apply binder wire about the toe, and means for effecting a decrease of the pressure of the wipers on the upper heightwise of the last before the machine is thus brought to a stop and a further decrease of said pressure after the machine is again started to facilitate tightening of the wire about the margin of the upper.

5. In a power-operated lasting machine, wipers formed to embrace an upper about the toe end of a last and movable to wipe the marginal portion of the upper inwardly over an insole on the last and against a lip or shoulder on the insole, automatic means for bringing the machine to a stop when the wipers are substantially at the limit of their overwiping movement in pressure-applying relation to the upper to permit binder wire to be applied about the toe, and power-operated mechanism for imparting to the wipers a retractive movement when the machine is again started and for then operating them to press the wire inwardly against the margin of the upper.

6. In a power-operated lasting machine, wipers for embracing an upper about the toe end of a last, power-operated means for imparting to said wipers an overwiping movement to wipe the marginal portion of the upper inwardly over an insole on the last and against a lip or shoulder on the insole and another overwiping movement thereafter to force a binder wire against the upstanding margin of the upper, automatic means for bringing the machine to a stop after said first-mentioned overwiping movement of the wipers to permit binder wire to be applied about the toe and again after the wipers have forced the wire against the upper and while they are in pressure-applying relation to the wire to permit the wire to be fastened to the shoe, means for gripping the margin of the toe end of the upper and for exerting a pull on the upper as it is wiped inwardly by the wipers, and automatic means for releasing said upper-gripping means from the upper prior to said first-mentioned stop in the operation of the machine.

7. In a power-operated lasting machine, wipers for embracing an upper about the toe end of a last, power-operated means for imparting to said wipers an overwiping movement to wipe the marginal portion of the upper inwardly over an insole on the last and against a lip or shoulder on the insole and another overwiping movement thereafter to force a binder wire against the upstanding margin of the upper, automatic means for bringing the machine to a stop after said first-mentioned overwiping movement of the wipers to permit binder wire to be applied about the toe and again after the wipers have forced the wire against the upper and while they are in pressure-applying relation to the wire to permit the wire to be fastened to the shoe, grippers for gripping the margin of the upper around the toe and for exerting a pull on the upper as it is wiped inwardly by the wipers while maintaining an unslipping grip on the upper, and automatic means for opening said grippers to release the margin of the upper prior to said first-mentioned stop in the operation of the machine.

8. In a power-operated lasting machine, wipers formed to embrace an upper about the toe end of a last and movable to wipe the marginal portion of the upper inwardly over an insole on the last and against a lip or shoulder on the insole, automatic means for bringing the machine to a stop after the overwiping movement of the wipers while they are in pressure-applying relation to the upper to permit binder wire to be applied about the toe, power-operated mechanism for partially retracting the wipers when the machine is again started and for then imparting to them another overwiping movement to press the wire inwardly against the upstanding margin of the upper, grippers for gripping the margin of the upper and for exerting a pull on the upper as it is wiped inwardly by the wipers, and automatic means for opening said grippers to release the margin of the upper prior to said stop in the operation of the machine.

9. In a power-operated lasting machine, wipers for embracing an upper about the toe end of a last and for wiping its marginal portion inwardly over an insole on the last, means for gripping the margin of the toe end of the upper, mechanism for operating said upper-gripping means prior to the wiping of the upper over the insole to pull the upper outwardly over the wipers while the wipers are spaced a substantial distance from the edge of the insole, and power-operated mechanism for effecting relative movement of said upper-gripping means and the last to pull the upper heightwise of the last after the outward pull has been substantially completed.

10. In a power-operated lasting machine, wipers for embracing an upper about the toe end of a last and for wiping it heightwise of the last and inwardly over an insole on the last, means for gripping the margin of the toe end of the upper, mechanism for operating said upper-gripping means to pull the upper outwardly over the wipers, and power-operated mechanism for effecting relative movement of the last and said upper-gripping means and the wipers to pull and to wipe the upper heightwise of the last simultaneously after the outward pull has been substantially completed.

11. In a power-operated lasting machine, wipers for embracing an upper about the toe end of a last and for wiping it heightwise of the last and inwardly over an insole on the last, means for gripping the margin of the toe end of the upper, and power-operated mechanism for operating said upper-gripping means to pull the upper outwardly over the wipers prior to the wiping of the upper heightwise of the last and then to pull it heightwise of the last after the outward pull has been substantially completed as the upper is wiped heightwise of the last by the wipers.

12. In a power-operated lasting machine, wipers for embracing an upper about the toe end of a last, means for imparting to said wipers upwiping movement heightwise of the last and movement to wipe the marginal portion of the upper inwardly over an insole on the last, means for gripping the margin of the toe end of the upper, and power-operated mechanism for operating said upper-gripping means to pull the upper outwardly over the wipers prior to the upwiping movement of the wipers and thereafter to pull it heightwise of the last simultaneously with said upwiping movement.

13. In a power-operated lasting machine, wipers for embracing an upper about the toe end of a last and for wiping its marginal portion inwardly over an insole on the last, means for gripping the margin of the toe end of the upper, and a cam-operated member for operating both said upper-gripping means and the wipers to pull and to wipe the upper heightwise of the last before it is wiped inwardly over the insole.

14. In a power-operated lasting machine, wipers for embracing an upper about the toe end of a last and for wiping it heightwise of the last and inwardly over an insole on the last, a plurality of grippers for gripping the margin of the upper around the toe, and mechanism for operating said grippers to pull the upper outwardly over the wipers in different directions respectively prior to any substantial wiping of the upper heightwise of the last and then to pull it heightwise of the last after the outward pull has been substantially completed as the upper is wiped heightwise of the last by the wipers.

15. In a power-operated lasting machine, wipers for embracing an upper about the toe end of a last, means for imparting to said wipers upwiping movement heightwise of the last and movement to wipe the marginal portion of the upper inwardly over an insole on the last, a plurality of grippers for gripping the margin of the upper around the toe, and mechanism for operating said grippers to pull the upper outwardly over the wipers in different directions respectively prior to any substantial upwiping movement of the wipers and then to pull it heightwise of the last in the course of the upwiping movement of the wipers after the outward pull has been substantially completed.

16. In a lasting machine, the combination with wipers for wiping the marginal portion of an upper about the toe end of a last inwardly over an insole on the last, of a plurality of grippers for gripping the margin of the upper around the toe, spring means for operating said grippers to pull the upper outwardly over the wipers in different directions respectively, and mechanism arranged to act against the resistance of said spring means initially to position the grippers and movable to release them to the action of said means.

17. In a lasting machine, the combination with wipers for wiping the marginal portion of an upper about the toe end of a last inwardly over an insole on the last, of a plurality of grippers for gripping the margin of the upper around the toe, springs connected respectively to the different grippers for operating them to pull the upper outwardly over the wipers, mechanism arranged to act against the resistance of said springs initially to position the grippers and movable to release them to the action of the springs, and a member common to the several springs for varying the force with which they operate the grippers.

18. In a lasting machine, the combination with wipers for wiping the marginal portion of an upper about the toe end of a last inwardly over an insole on the last, of a plurality of grippers for gripping the margin of the upper around the toe, devices connected respectively to the different grippers and mounted for turning movements to operate the grippers to pull the upper outwardly over the wipers, spring means for thus turning said devices, and mechanism for holding said devices and the grippers initially positioned against the resistance of said spring means and for releasing the devices to the action of said means.

19. In a lasting machine, the combination with wipers for wiping the marginal portion of an upper about the toe end of a last inwardly over an insole on the last, of a plurality of grippers for gripping the margin of the upper around the toe, devices connected respectively to the different grippers and mounted for turning movements to operate the grippers to pull the upper outwardly over the wipers, spring means for thus turning said devices, a shaft about the axis of which the devices are thus movable, means carried by said shaft for holding said devices and the grippers initially positioned against the resistance of said spring means and for releasing the devices to the action of said spring means as the shaft is turned, and means for turning said shaft.

20. In a lasting machine, the combination with wipers for wiping the marginal portion of an upper about the toe end of a last inwardly over an insole on the last, of a plurality of grippers for gripping the margin of the upper around the toe, spring means for operating said grippers to pull the upper outwardly over the wipers, and mechanism constructed to act frictionally to increase the force with which the grippers thus pull the upper.

21. In a lasting machine, the combination with wipers for wiping the marginal portion of an upper about the toe end of a last inwardly over an insole on the last, of a plurality of grippers for gripping the margin of the upper around the toe, spring means for operating said grippers to pull the upper outwardly over the wipers, and mechanism arranged to act against the resistance of said spring means initially to position the grippers, said mechanism being movable to permit the grippers to be operated by said spring means and being constructed to act frictionally in that movement to increase the force with which the grippers thus pull the upper.

22. In a lasting machine, the combination with wipers for wiping the marginal portion of an upper about the toe end of a last inwardly over an insole on the last, of a plurality of grippers for gripping the margin of the upper around the toe, devices connected respectively to the different grippers and mounted for turning movements to operate the grippers to pull the upper outwardly over the wipers, spring means for thus turning said devices, and rotatable means constructed to act frictionally on said devices to increase the force with which the grippers thus pull the upper.

23. In a lasting machine, the combination with wipers for wiping the marginal portion of an upper about the toe end of a last inwardly over an insole on the last, of a plurality of grippers for gripping the margin of the upper around the toe, devices connected respectively to the different grippers and mounted for turning movements to operate the grippers to pull the upper outwardly over the wipers, spring means for thus turning said devices, and mechanism for holding said devices and the grippers initially positioned against the resistance of said spring means, said mechanism being rotatable to release the devices to the action of said spring means and being constructed to act frictionally on said devices to increase the force with which the grippers thus pull the upper.

24. In a lasting machine, the combination with wipers for wiping the marginal portion of an upper about the toe end of a last inwardly over an insole on the last, of a plurality of grippers for gripping the margin of the upper around the toe, devices connected respectively to the different grippers and mounted for turning movements to operate the grippers to pull the upper outwardly over the wipers, spring means for thus turning said devices, a shaft about the axis of which the devices are thus movable, means carried by said shaft for holding said devices and the grippers initially positioned against the resistance of said spring means and for releasing the devices to the action of said spring means as the shaft is turned, and means also carried by said shaft for engaging said devices frictionally to increase the force with which the grippers thus pull the upper.

25. In a lasting machine, the combination with wipers for wiping the marginal portion of an upper about the toe end of a last inwardly over an insole on the last, of a plurality of grippers for gripping the margin of the upper around the toe, friction means mounted for turning movement, friction clamps applied to said friction means and connected respectively to the different grippers for operating the grippers to pull the upper outwardly over the wipers by turning movement of the clamps, spring means connected to said clamps for holding them tightly applied to said friction means and for also turning them to operate the grippers, and mechanism for turning said friction means to increase the force of the pull of the grippers on the upper by the frictional action of said means on the clamps.

26. In a lasting machine, the combination with wipers for wiping the marginal portion of an upper about the toe end of a last inwardly over an insole on the last, of a plurality of grippers for gripping the margin of the upper around the toe, a shaft mounted for turning movement, friction rings carried by said shaft, friction clamps embracing said friction rings and connected respectively to the different grippers for operating the grippers to pull the upper outwardly over the wipers by turning movement of said clamps, springs connected respectively to said different clamps for holding them tightly applied to said friction rings and for also turning them to operate the grippers, and means for turning said shaft to increase the force of the pull of the grippers on the upper by the frictional action of the friction rings on said clamps.

27. In a lasting machine, the combination with wipers for wiping the marginal portion of an upper about the toe end of a last inwardly over an insole on the last, of a plurality of grippers for gripping the margin of the upper around the toe and for pulling it outwardly over the wipers, spring means arranged to act on said grippers to maintain an outward pull on the upper as the upper is wiped inwardly by the wipers, and mechanism movable in the wiping operation partially to counteract the force of said spring means in its action on the grippers.

28. In a lasting machine, the combination with wipers for wiping the marginal portion of an upper about the toe end of a last inwardly over an insole on the last, of a plurality of grippers for gripping the margin of the upper around the toe and for pulling it outwardly over the wipers, spring means arranged to act on said grippers to maintain an outward pull on the upper as the upper is wiped inwardly by the wipers, connections between said spring means and the grippers, and movable mechanism arranged to act frictionally on said connections in the wiping operation partially to counteract the force of said spring means in its action on the grippers.

29. In a lasting machine, the combination with wipers for wiping the marginal portion of an upper about the toe end of a last inwardly over an insole on the last, of a plurality of grippers for gripping the margin of the upper around the toe and for pulling it outwardly over the wipers, devices connected respectively to the different grippers and mounted for turning movements to cause the grippers thus to pull the upper outwardly, spring means tending thus to turn said devices to maintain an outward pull on the upper as the upper is wiped inwardly by the wipers, and rotatable means arranged to act frictionally on said devices with a tendency to turn them reversely in the wiping operation and thus partially to counteract the force of said spring means.

30. In a lasting machine, the combination with wipers for wiping the marginal portion of an upper about the toe end of a last inwardly over an insole on the last, of a plurality of grippers for gripping the margin of the upper around the toe and for pulling it outwardly over the wipers, devices connected respectively to the different grippers and mounted for turning movements to cause the grippers thus to pull the upper outwardly, spring means tending thus to turn said devices to maintain an outward pull on the upper as the upper is wiped inwardly by the wipers, a shaft about the axis of which the devices are thus movable, friction means on said shaft in contact with said devices, and mechanism for turning said shaft and friction means in the wiping operation in a direction partially to counteract the force of said spring means by the action of the friction means on said devices.

31. In a lasting machine, the combination with wipers for wiping the marginal portion of an upper about the toe end of a last inwardly over an insole on the last, of a plurality of grippers for gripping the margin of the upper around the toe, spring means for operating said grippers to pull the upper outwardly over the wipers and for maintaining an outward pull on the upper as the upper is wiped inwardly by the wipers, and movable mechanism constructed to act frictionally first to increase the force with which the grippers thus pull the upper and thereafter partially to counteract the force of said spring means in its action on the grippers as the upper is wiped inwardly by the wipers.

32. In a lasting machine, the combination with wipers for wiping the marginal portion of an upper about the toe end of a last inwardly over an insole on the last, of a plurality of grippers for gripping the margin of the upper around the toe, devices connected respectively to the different grippers and mounted for turning movements to operate the grippers to pull the upper outwardly over the wipers, spring means for thus turning said devices and for maintaining an outward pull on the upper as the upper is wiped inwardly by the wipers, and rotatable means arranged to act frictionally on said devices by movement in one direction to increase the force with which the grippers pull the upper and thereafter by reverse movement partially to counteract the force of said spring means as the upper is wiped inwardly by the wipers.

33. In a lasting machine, the combination with wipers for wiping the marginal portion of an upper about the toe end of a last inwardly over an insole on the last, of a plurality of grippers for gripping the margin of the upper around the toe, friction means mounted for turning movement, friction clamps applied to said friction means and connected respectively to the different grippers for operating the grippers to pull the upper outwardly over the wipers by turning movement of the clamps, spring means connected to said clamps for holding them tightly applied to said friction means and for also turning them to operate the grippers, and mechanism for turning said friction means in one direction to increase the force of the pull of the grippers on the upper by the frictional action of said means on the clamps and for thereafter turning said friction means in the opposite direction partially to counteract the force of said spring means as the upper is wiped inwardly by the wipers.

34. In a lasting machine, the combination with means for wiping the marginal portion of an upper inwardly over the bottom of a last, of a gripper for gripping the margin of the upper, a spring for operating said gripper to pull the upper outwardly over said wiping means, means connecting said spring to the gripper, and mechanism arranged to act on said connecting means against the resistance of the spring initially to position the gripper and movable to permit the operation of the gripper by the spring.

35. In a lasting machine, the combination with means for wiping the marginal portion of an upper inwardly over the bottom of a last, of a gripper for gripping the margin of the upper, a device mounted for turning movement for operating said gripper to pull the upper outwardly over said wiping means, a spring for thus turning said device, and mechanism arranged to act on said device against the resistance of the spring initially to position the gripper and movable to permit the operation of the gripper by the spring.

36. In a lasting machine, the combination with means for wiping the marginal portion of an upper inwardly over the bottom of a last, of a gripper for gripping the margin of the upper, a spring for operating said gripper to pull the upper outwardly over said wiping means, and mechanism comprising relatively movable members arranged to act by frictional contact with each other to increase the force of the outward pull of the gripper on the upper.

37. In a lasting machine, the combination with means for wiping the marginal portion of an upper inwardly over the bottom of a last, of a gripper for gripping the margin of the upper, a device mounted for turning movement for operating said gripper to apply to the upper an outward pull relatively to said wiping means, a spring for thus turning said device, and mechanism arranged to act on said device against the resistance of the spring initially to position the gripper, said mechanism being rotatable to permit the operation of the gripper by the spring and having means arranged to act frictionally on said device to increase the force of the pull of the gripper on the upper.

38. In a lasting machine, the combination with means for wiping the marginal portion of an upper inwardly over the bottom of a last, of a gripper for gripping the margin of the upper, a rotatable friction member, a clamp applied about said member and connected to the gripper for operating it to apply to the upper an outward pull relatively to said wiping means by turning movement of the clamp, a spring connected to said clamp for tightening it about said friction member and for also turning it to operate the gripper, and means for turning said friction member to increase the force of the pull of the gripper on the upper by frictional action of said member on the clamp.

39. In a lasting machine, the combination with means for wiping the marginal portion of an upper inwardly over the bottom of a last, of a gripper for gripping the margin of the upper, a spring arranged to act on said gripper to maintain a pull on the upper as the upper is wiped inwardly by the wiping means, and mechanism comprising relatively movable members arranged to act by frictional contact with each other partially to counteract the force of said spring in its action on the gripper in the wiping operation.

40. In a lasting machine, the combination with means for wiping the marginal portion of an upper inwardly over the bottom of a last, of a gripper for gripping the margin of the upper, a device connected to said gripper and mounted for turning movement to cause the gripper to apply to the upper an outward pull relatively to the wiping means, a spring tending thus to turn said device to maintain an outward pull on the upper as the upper is wiped inwardly by the wiping means, a rotatable friction member in engagement with said device, and means for turning said member partially to counteract the force of said spring by its frictional action on said device in the wiping operation.

41. In a lasting machine, the combination with means for wiping the marginal portion of an upper inwardly over the bottom of a last, of a gripper for gripping the margin of the upper, a spring for operating said gripper to pull the upper, means connecting said spring to the gripper, and mechanism arranged to act frictionally on said connecting means first to increase the force of the pull of the gripper on the upper and thereafter partially to counteract the force of said spring in its action on the gripper as the upper is wiped inwardly by the wiping means.

42. In a lasting machine, the combination with means for wiping the marginal portion of an upper inwardly over the bottom of a last, of a gripper for gripping the margin of the upper, a device mounted for turning movement for operating said gripper to apply to the upper an outward pull relatively to said wiping means, a spring for thus turning said device and for maintaining an outward pull on the upper in the wiping operation, and rotatable means arranged to act frictionally on said device to increase the force of the pull of the gripper on the upper by movement in one direction and thereafter partially to counteract the force of the spring in its action on the gripper by movement in the opposite direction.

43. In a lasting machine, a gripper arranged to grip the margin of an upper on a last at the end of the toe and movable lengthwise of the last to pull the upper, other grippers arranged to grip the margin of the upper at the sides of the toe and movable widthwise of the last to pull the upper, springs connected respectively to the different grippers for thus operating them, and means arranged to act against the resistance of said springs initially to position the grippers and movable to permit the operation of the grippers by the springs.

44. In a lasting machine, a gripper arranged to grip the margin of an upper on a last at the end of the toe and movable lengthwise of the last to pull the upper, other grippers arranged to grip the margin of the upper at the sides of the toe and movable widthwise of the last to pull the upper, members connected respectively to the different grippers and mounted for turning movements thus to operate the grippers, springs for thus turning said members, and means rotatable to release said members to the action of the springs.

45. In a lasting machine, a gripper arranged to grip the margin of an upper on a last at the end of the toe and movable lengthwise of the last to pull the upper, other grippers arranged to grip the margin of the upper at the sides of the toe and movable widthwise of the last to pull the upper, springs for thus operating the grippers to pull the upper, and devices arranged to act frictionally to increase the force of the pull of the grippers on the upper.

46. In a lasting machine, a gripper arranged to grip the margin of an upper on a last at the end of the toe and movable lengthwise of the last to pull the upper, other grippers arranged to grip the margin of the upper at the sides of the toe and movable widthwise of the last to pull the upper, a rock shaft, devices mounted to turn about the axis of said rock shaft and connected respectively to the different grippers for thus operating them to pull the upper, springs for thus turning said devices, and means carried by said rock shaft for releasing said devices to the action of the springs and for also increasing the force of the pull of the grippers on the upper by frictional contact with said devices.

47. In a lasting machine, a plurality of grippers arranged to grip the margin of an upper on a last in different locations respectively, a rotatable member, devices mounted to turn about the axis of said member and connected respectively to the different grippers for operating them to pull the upper, springs for thus turning said devices, and means carried by said rotatable member for positioning said devices and the grippers initially against the resistance of said springs and for releasing said devices to the action of the springs by the turning of said member.

48. In a lasting machine, a plurality of grippers arranged to grip the margin of an upper on a last in different locations respectively, a rotatable member, devices mounted to turn about the axis of said member and connected respectively to the different grippers for operating them to pull the upper, springs for thus turning said devices, and means for releasing said devices to the action of the springs by the turning of said member and for also engaging the devices frictionally to increase the force of the pull of the grippers on the upper as the member is thus turned.

49. In a lasting machine, a gripper for applying a pull to an upper on a last, a spring for thus operating the gripper, means arranged to act against the resistance of said spring initially to position the gripper and movable to permit the operation of the gripper by the spring, and means arranged to act frictionally to increase the force of the pull of the gripper on the upper.

50. In a lasting machine, a gripper for applying a pull to an upper on a last, a device mounted for turning movement and connected to the gripper for thus operating it, a spring for thus turning said device, and a member arranged to act on said device against the resistance of the spring initially to position the gripper and movable to permit the operation of the gripper by the spring, said member being provided with means for increasing the force of the pull of the gripper on the upper by frictional contact with said device.

51. In a lasting machine, a gripper for applying a pull to an upper on a last, a spring for thus operating the gripper, means arranged to act against the resistance of said spring initially to position the gripper and movable to permit the operation of the gripper by the spring, and frictionally acting means movable in one direction to increase the force of the pull of the gripper on the upper and reversely movable thereafter partially to counteract the force of the spring in its action on the gripper.

52. In a lasting machine, a gripper arranged to grip the margin of an upper on a last, a member mounted for turning movement and connected to said gripper for operating it to pull the upper, another member mounted for turning movement about the same axis as said first-named member to operate the latter, and means for effecting a preliminary adjustment of the gripper by relative movement of said members.

53. In a lasting machine, a gripper arranged to grip the margin of an upper on a last at the end of the toe and movable lengthwise of the last to pull the upper, an arm mounted for swinging movement and connected to said gripper for thus operating it, another arm mounted to swing about the same axis as said first-named arm to operate the latter, and an operating connection between said arms movable to adjust the gripper lengthwise of the last by relative movement of the arms.

54. In a power-operated lasting machine, a work rest for positioning a last having an upper thereon, a gripper for gripping the margin of the upper and for applying a pull to the upper, said gripper having jaws arranged to present an opening between them to receive the margin of the upper when the work is presented to the machine, and automatic means for moving said gripper in a direction to cause more of the upper to extend into said opening prior to the gripping of the upper by the jaws.

55. In a power-operated lasting machine, a work rest for positioning a last having an upper thereon, a gripper for gripping the margin of the upper at the end of the toe and for applying a pull to the upper, said gripper having jaws arranged to present an opening between them extending generally lengthwise of the last to receive the margin of the upper when the work is presented to the machine, and automatic means for moving said gripper lengthwise of the last toward the toe end thereof prior to the gripping of the upper by said jaws.

56. In a lasting machine, a gripper for gripping the margin of an upper on a last, a member for moving said gripper heightwise of the last to pull the upper, another member movable initially into operative relation to said first-named member and then further movable to operate the latter, and means for adjusting the gripper heightwise of the last while variably spacing said first-named member from the other member.

57. In a lasting machine, a gripper for gripping the margin of an upper on a last, an arm mounted for swinging movement for operating said gripper to pull the upper heightwise of the last, a member movable first toward said arm and then further movable to operate the arm, and means for adjusting the gripper heightwise of the last while swinging the arm relatively to said member.

58. In a lasting machine, a gripper for gripping the margin of an upper on a last, an arm connected to said gripper and mounted for swinging movement for operating the gripper to pull the upper heightwise of the last, another arm mounted to swing with said first-named arm, a third arm mounted for swinging movement first toward said other arm and then to operate the latter, and mechanism connected to said first-named arm for adjusting the gripper heightwise of the last while variably spacing said other arm from the third arm.

59. In a lasting machine, a gripper for gripping the margin of an upper on a last, a lever fulcrumed between its opposite ends and arranged to support the gripper on one arm thereof, a member movable into operative relation to the other arm of said lever and then further movable to operate the lever for imparting to the gripper upper-pulling movement heightwise of the last, and means for swinging said lever to adjust the gripper heightwise of the last while variably spacing said other arm of the lever from said member.

60. In a lasting machine, a gripper for gripping the margin of an upper on a last, a member offset from said gripper but connected therewith, an arm mounted for swinging movement and positioned under said member to support the gripper through said member, and operating means normally disconnected from said arm but arranged to swing it to impart to the gripper upper-pulling movement heightwise of the last, the arm being adjustable independently of said operating means to adjust the gripper heightwise of the last.

61. In a lasting machine, a gripper for gripping the margin of an upper on a last, a member offset from said gripper but connected therewith, a lever fulcrumed between its opposite ends with one arm under said member to support the gripper through said member, operating means normally disconnected from said lever but arranged to swing it by engagement with the other arm thereof to impart to the gripper upper-pulling movement heightwise of the last, and means for variably swinging said lever independently of said operating means to adjust the gripper heightwise of the last.

62. In a lasting machine, a gripper for gripping the margin of an upper on a last positioned bottom upward, a rod connected to said gripper and arranged to extend heightwise of the last, an arm mounted for swinging movement and supporting the gripper by contact with the lower end of said rod, and means for swinging said arm to impart to the gripper upper-pulling movement heightwise of the last.

63. In a lasting machine, a gripper for gripping the margin of an upper on a last positioned bottom upward, a rod connected to said gripper and arranged to extend heightwise of the last, an arm mounted for swinging movement and supporting the gripper by contact with the lower end of said rod, operating means for swinging said arm to impart to the gripper upper-pulling movement heightwise of the last, and a member supporting said arm independently of said operating means and movable to adjust the gripper heightwise of the last.

64. In a lasting machine, a gripper for gripping the margin of an upper on a last positioned bottom upward, a rod connected to said gripper and arranged to extend heightwise of the last, a lever fulcrumed between its opposite ends with one of its arms under the lower end of said rod for supporting the gripper, a member movable into contact with the other arm of said lever and further movable to operate the lever for imparting to the gripper upper-pulling movement heightwise of the last, and means for swinging said lever to adjust the gripper heightwise of the last while variably spacing said other arm of the lever from said member.

65. In a lasting machine, grippers arranged to grip the margin of an upper on a last positioned bottom upward at the opposite sides of the toe respectively, rods connected respectively to said different grippers and arranged to extend heightwise of the last, members positioned under the lower ends of said rods to support the grippers through the rods, means for operating said members to impart to the grippers upper-pulling movements heightwise of the last, and means for swinging the grippers about the axes of said rods to pull the upper widthwise of the last.

66. In a lasting machine, grippers arranged to grip the margin of an upper on a last positioned bottom upward at the opposite sides of the toe respectively, rods connected respectively to said different grippers and arranged to extend heightwise of the last, levers arranged to support said grippers by contact with the lower ends of said rods, means for operating said levers to impart to the grippers upper-pulling movements heightwise of the last, arms rigidly connected to said grippers, and means for operating said arms to swing the grippers about the axes of said rods for pulling the upper widthwise of the last.

67. In a lasting machine, grippers arranged to grip the margin of an upper on a last at the opposite sides of the toe respectively, means for swinging said grippers about axes extending heightwise of the last to pull the upper widthwise of the last, and means for variably adjusting the grippers about axes extending lengthwise of the last.

68. In a lasting machine, grippers arranged to grip the margin of an upper on a last at the opposite sides of the toe respectively, means for swinging said grippers about axes extending heightwise of the last to pull the upper widthwise of the last, and members mounted for swinging movements about axes extending in angular relation to each other lengthwise of the last to adjust the grippers widthwise of the last about the axes of said members.

69. In a lasting machine, grippers arranged to grip the margin of an upper on a last at the opposite sides of the toe respectively, means for swinging said grippers about axes extending heightwise of the last to pull the upper widthwise of the last, and members provided with bearings to guide the grippers in such swinging movements, said members being movable about axes extending lengthwise of the last to adjust the grippers widthwise of the last.

70. In a lasting machine, grippers arranged to grip the margin of an upper on a last at the opposite sides of the toe respectively, gripper-controlling members mounted for swinging movements about axes extending lengthwise of the last to adjust the grippers widthwise of the last, and means for swinging the grippers relatively to said members about axes extending heightwise of the last to pull the upper widthwise of the last.

71. In a lasting machine, grippers arranged to grip the margin of an upper on a last at the opposite sides of the toe respectively, gripper-controlling members mounted for swinging movements about axes extending lengthwise of the last, and devices connected respectively to said different members for swinging them to adjust the grippers each independently of the other widthwise of the last, said members being provided with means to guide the grippers for swinging movements about axes extending heightwise of the last to pull the upper widthwise of the last.

72. In a lasting machine, grippers arranged to grip the margin of an upper on a last at the opposite sides of the toe respectively, gripper-controlling members mounted for swinging movements about axes extending lengthwise of the last to adjust the grippers widthwise of the last, and means for moving the grippers heightwise of the last relatively to said members to pull the upper, said members being provided with means for guiding the grippers in their movements heightwise of the last.

73. In a lasting machine, grippers arranged to grip the margin of an upper on a last at the opposite sides of the toe respectively, means for imparting to said grippers upper-pulling movements heightwise of the last and for also swinging them about axes extending heightwise of the last to pull the upper widthwise of the last, and members provided with means for guiding the grippers in their upper-pulling movements heightwise and widthwise of the last, said members being movable about axes extending lengthwise of the last to adjust the grippers widthwise of the last.

74. In a lasting machine, grippers arranged to grip the margin of an upper on a last at the opposite sides of the toe respectively, rods connected to said grippers to move therewith and arranged to extend heightwise of the last, levers arranged to support the grippers through said rods and movable to impart to the grippers upper-pulling movements heightwise of the last, and members provided with bearings to guide said rods in their movements with the grippers, said members being movable about axes extending lengthwise of the last to adjust the grippers widthwise of the last.

75. In a lasting machine, grippers arranged to grip the margin of an upper on a last at the opposite sides of the toe respectively, members movable with said grippers heightwise of the last for operating the grippers to pull the upper, said members being also mounted to swing with the grippers about axes extending widthwise of the last, and means for thus swinging said members to adjust the grippers lengthwise of the last.

76. In a lasting machine, grippers arranged to grip the margin of an upper on a last at the opposite sides of the toe respectively, members movable with said grippers heightwise of the last for operating the grippers to pull the upper, said members being also mounted to swing with the grippers about axes extending widthwise of the last, spring means tending to swing said members each in one direction, and devices for swinging the members against the resistance of said spring means to adjust the grippers lengthwise of the last.

77. In a lasting machine, grippers arranged to grip the margin of an upper on a last at the opposite sides of the toe respectively, members fast on said grippers and movable with them heightwise of the last, other members also movable with the grippers heightwise of the last and relatively to which said first-named members are movable about axes extending widthwise of the last to adjust the grippers lengthwise of the last, means for thus adjusting the grippers by relative movements of said members, and means for operating said other members to impart to the grippers upper-pulling movements heightwise of the last.

78. In a lasting machine, grippers arranged to grip the margin of an upper on a last at the opposite sides of the toe respectively, means for swinging said grippers about axes extending heightwise of the last to pull the upper widthwise of the last, and means for swinging the grippers about ares extending widthwise of the last to adjust them lengthwise of the last.

79. In a lasting machine, grippers arranged to grip the margin of an upper on a last at the opposite sides of the toe respectively, and different pairs of members associated respectively with the different grippers and movable about axes extending heightwise of the last to cause the grippers to pull the upper widthwise of the last, one member of each pair being movable with the corresponding gripper relatively to the other member about an axis extending widthwise of the last to adjust the gripper lengthwise of the last.

80. In a lasting machine, the combination with wipers movable to wipe the marginal portion of an upper about the toe end of a last inwardly over an insole on the last, of grippers for gripping the margin of the upper respectively in locations substantially at the corners of the toe and for holding the upper under tension as it is wiped inwardly by the wipers, said grippers being movable inwardly in converging directions in the wiping operation, and means affording provision for additional movements of said grippers in directions more nearly lengthwise of the last toward the heel end of the last as the wipers wipe the upper inwardly.

81. In a lasting machine, the combination with wipers movable to wipe the marginal portion of an upper about the toe end of a last inwardly over an insole on the last, of grippers for gripping the margin of the upper respectively in locations substantially at the corners of the toe and for holding the upper under tension as it is wiped inwardly by the wipers, said grippers being movable inwardly in converging directions in the wiping operation, and yieldable means against the resistance of which said grippers are additionally movable in directions more nearly lengthwise of the last toward the heel end of the last in response to pull of the upper thereon as the wipers wipe the upper inwardly.

82. In a lasting machine, the combination with wipers movable to wipe the marginal portion of an upper about the toe end of a last inwardly over an insole on the last, of grippers for gripping the margin of the upper respectively in locations substantially at the corners of the toe and for holding the upper under tension as it is wiped inwardly by the wipers, said grippers being movable inwardly in the wiping operation about axes extending heightwise of the last, and means affording provision for additional movements of said grippers in directions toward the heel end of the last about axes extending widthwise of the last as the wipers wipe the upper inwardly.

83. In a lasting machine, the combination with wipers movable to wipe the marginal portion of an upper about the toe end of a last inwardly over an insole on the last, of grippers for gripping the margin of the upper respectively in locations substantially at the corners of the toe and for holding the upper under tension as it is wiped inwardly by the wipers, different pairs of members connected respectively to said different grippers and movable about axes extending heightwise of the last to permit the grippers to swing inwardly about said axes in the wiping operation, one member of each pair being movable with the corresponding gripper relatively to the other member about an axis extending laterally of the last, and spring means against the resistance of which each gripper may swing in a direction toward the heel end of the last about said laterally extending axis in response to pull of the upper thereon as the upper is wiped inwardly by the wipers.

84. In a lasting machine, the combination with wipers movable to wipe the marginal portion of an upper about the toe end of a last inwardly over an insole on the last, of grippers for gripping the margin of the upper respectively in locations substantially at the corners of the toe and for holding the upper under tension as it is wiped inwardly by the wipers, means for swinging said grippers with components of movement lengthwise and widthwise of the last to pull the upper outwardly over the wipers, the grippers being thereafter reversely movable inwardly in the wiping operation and additionally movable lengthwise of the last in directions toward its heel end in response to pull of the upper thereon, and spring means against the resistance of which the grippers are thus movable lengthwise of the last.

85. In a lasting machine, the combination with wipers movable to wipe the marginal portion of an upper about the toe end of a last inwardly over an insole on the last, of grippers for gripping the margin of the upper respectively at the end and the sides of the toe and for holding the upper under tension as it is wiped inwardly by the wipers, the end and side grippers being movable inwardly in converging directions in the wiping operation, and means affording provision for additional movements of the side grippers relatively to the end gripper in directions lengthwise of the last toward the heel end of the last in response to pull of the upper thereon as the wipers wipe the upper inwardly.

86. In a lasting machine, the combination with wipers movable to wipe the marginal portion of an upper about the toe end of a last inwardly over an insole on the last, of grippers for gripping the margin of the upper respectively at the end and the sides of the toe, the end and side grippers being movable respectively about different axes to pull the upper outwardly over the wipers and thereafter reversely movable inwardly about said axes in the wiping operation, means affording provision for movements of the side grippers relatively to the end gripper about other axes in directions toward the heel end of the last in response to pull of the upper thereon as the wipers wipe the upper inwardly, and spring means against the resistance of which the side grippers are thus movable about said other axes.

87. In a lasting machine, the combination with wipers for wiping the marginal portion of an upper about the toe end of a last inwardly over an insole on the last, of a plurality of grippers arranged to grip the margin of the upper respectively in different locations around the toe to cooperate with the wipers in lasting the toe end of the upper, each of said grippers having a pair of upper-gripping jaws and including spring-operated jaw-closing mechanism for effecting relative closing movement of said jaws to grip the upper, jaw-opening means arranged to act by pressure on the jaw-closing mechanisms exteriorly of the grippers to open the jaws, said jaw-opening means being movable to cause the closing of the jaws by release of said jaw-closing mechanisms, and means arranged to act on the grippers independently of said jaw-opening means to impart upper-pulling movements to the grippers.

88. In a lasting machine, the combination with wipers for wiping the marginal portion of an upper about the toe end of a last inwardly over an insole on the last, of a plurality of grippers arranged to grip the margin of the upper respectively in different locations around the toe to cooperate with the wipers in lasting the toe end of the upper, each of said grippers having a pair of upper-gripping jaws and including spring-operated jaw-closing mechanism for effecting relative closing movement of said jaws to grip the upper, jaw-opening means arranged to act on the jaw-closing mechanisms exteriorly of the grippers to open the jaws, said jaw-opening means being movable to a position out of operative relation to the grippers to cause the closing of the jaws by release of said jaw-closing mechanisms, and means for operating the grippers to pull the upper while the jaw-opening means is thus out of operative relation to the grippers.

89. In a lasting machine, the combination with wipers for wiping the marginal portion of an upper about the toe end of a last inwardly over an insole on the last, of a plurality of grippers arranged to extend heightwise of the last and to grip the margin of the upper respectively in different locations around the toe to cooperate with the wipers in lasting the toe end of the upper, each of said grippers having a pair of upper-gripping jaws at one end thereof and including spring-operated jaw-closing mechanism for effecting relative closing movement of said jaws to grip the upper, jaw-opening means arranged to act by pressure on the jaw-closing mechanisms at the opposite ends of the grippers from said jaws to open the jaws, said jaw-opening means being movable heightwise of the last to release said mechanisms and thereby cause the closing of the jaws, and means movable independently of said jaw-opening means to impart to the grippers upper-pulling movements heightwise of the last.

90. In a lasting machine, a gripper comprising a pair of jaws for gripping the margin of an upper on a last and including also jaw-closing mechanism and a spring for operating said mechanism to effect relative closing movement of said jaws, gripper-operating means for imparting upper-pulling movement to the gripper, and a member movable independently of said gripper-operating means to open the jaws by movement of the jaw-closing mechanism against the resistance of said spring and to cause the closing of the jaws by releasing said mechanism to the action of the spring.

91. In a lasting machine, a gripper comprising a pair of jaws for gripping the margin of an upper on a last and including also jaw-closing mechanism and a spring for operating said mechanism to effect relative closing movement of said jaws, gripper-operating means for imparting upper-pulling movement to the gripper, and a member for opening the jaws by pressure upon the jaw-closing mechanism against the resistance of said spring, said member being movable independently of the gripper-operating means to release the jaw-closing mechanism to the action of the spring.

92. In a lasting machine, a gripper arranged to grip the margin of an upper on a last and to extend generally heightwise of the last, said gripper having a pair of upper-gripping jaws at one end thereof and including also jaw-closing mechanism and a spring for operating said mechanism to effect relative closing movement of the jaws, gripper-operating means for moving the gripper heightwise of the last to pull the upper, and a member arranged to apply pressure to the jaw-closing mechanism against the resistance of said spring at the opposite end of the gripper from said jaws to open the jaws, said member being movable heightwise of the last independently of said gripper-operating means to release the jaw-closing mechanism to the action of the spring and to permit the upper-pulling movement of the gripper.

93. In a lasting machine, a gripper arranged to grip the margin of an upper on a last and to extend generally heightwise of the last, said gripper having a pair of upper-gripping jaws at one end thereof and including also jaw-closing mechanism and a spring for operating said mechanism to effect relative closing movement of the jaws, gripper-operating means for moving the gripper heightwise of the last to pull the upper, a member disconnected from the gripper but arranged to press on the jaw-closing mechanism against the resistance of said spring at the opposite end of the gripper from said jaws to open the jaws, and means for moving said member heightwise of the last out of contact with the gripper to release the jaw-closing mechanism to the action of the spring and to permit the upper-pulling movement of the gripper.

94. In a lasting machine, a gripper comprising a casing, a jaw fixed on the casing, another jaw on the casing mounted to swing toward and from said fixed jaw, a bell-crank lever on the casing, a link connecting one arm of said bell-crank lever to the swinging jaw, a jaw-closing member, a link connecting the other arm of the bell-crank lever to said member, and a spring for operating said member to effect relative closing movement of the jaws.

95. In a lasting machine, a gripper comprising a casing, a jaw fixed on the casing, another jaw on the casing mounted to swing toward and from said fixed jaw, a bell-crank lever on the casing, a link connecting one arm of said bell-crank lever to the swinging jaw, a closing rod longitudinally movable in the casing, a link connecting the other arm of the bell-crank lever to said closing rod, and a spring for moving said closing rod in a direction away from the jaws to effect relative closing movement of the jaws.

96. In a lasting machine, wipers for embracing an upper about an end of a last and for wiping the marginal portion of the upper inwardly over the bottom of the last, a lever for operating said wipers, a fulcrum support for said lever, and yieldable means against the resistance of which said fulcrum support is movable in response to resistance of the upper to the movement of the wipers.

97. In a lasting machine, wipers for embracing an upper about an end of a last and for wiping the marginal portion of the upper inwardly over the bottom of the last, a lever for operating said wipers, a member mounted for movement about an axis and provided with a fulcrum support for said lever eccentric to the axis of said member, and spring means arranged to hold said member normally stationary but yieldable to permit movement of the member about its axis in response to resistance of the upper to the movement of the wipers.

98. In a lasting machine, wipers for embracing an upper about an end of a last and for wiping the marginal portion of the upper inwardly over the bottom of the last, a lever for operating said wipers, another lever on which said wiper-operating lever is fulcrumed, and yieldable means against the resistance of which said other lever is movable in response to resistance of the upper to the movement of the wipers.

99. In a lasting machine, wipers for embracing an upper about an end of a last and for wiping the marginal portion of the upper inwardly over the bottom of the last, a lever for operating said wipers, another lever on which said wiper-operating lever is fulcrumed, a rod connected to said other lever, and spring means arranged to act on said rod to hold said other lever normally stationary but yieldable to permit movement of said other lever in response to resistance of the upper to the movement of the wipers.

100. In a lasting machine, wipers for embracing an upper about an end of a last and for wiping the marginal portion of the upper inwardly over the bottom of the last, a wiper carrier supporting said wipers, a cam-operated lever for moving said wiper carrier lengthwise of the last to operate the wipers, a fulcrum support for said lever, and spring means against the resistance of which said fulcrum support is movable in response to resistance of the upper to the movement of the wiper carrier and wipers.

101. In a lasting machine, wipers for embracing an upper about an end of a last and for wiping the marginal portion of the upper inwardly over the bottom of the last, a lever for operating said wipers, and a fulcrum support for said lever, said fulcrum support being movable to adjust the wipers through said lever.

102. In a lasting machine, wipers for embracing an upper about an end of a last and for wiping the marginal portion of the upper inwardly over the bottom of the last, a lever for operating said wipers, another lever on which said wiper-operating lever is fulcrumed, and means for adjusting the wipers through their operating lever by movement of said other lever.

103. In a lasting machine, wipers for embracing an upper about an end of a last and for wiping the marginal portion of the upper inwardly over the bottom of the last, a lever for operating said wipers, a fulcrum support for said lever, a spring against the resistance of which said fulcrum support is movable in response to resistance of the upper to movement of the wipers, and means for adjusting the wipers through said lever by movement of said fulcrum support without affecting the stress of said spring.

104. In a lasting machine, wipers for embracing an upper about an end of a last and for wiping the marginal portion of the upper inwardly over the bottom of the last, a wiper carrier supporting said wipers, an operating lever for moving said wiper carrier lengthwise of the last to operate the wipers, another lever on which said operating lever is fulcrumed, a rod connected to said other lever, a spring arranged to act on said rod to hold said other lever normally stationary but yieldable to permit movement of said other lever in response to resistance of the upper to the movement of the wipers, and means for shifting said other lever to adjust the wiper carrier and the wipers by turning movement of said rod without affecting the stress of said spring.

105. In a lasting machine, the combination with shoe-positioning means, of a flexible heel band for embracing the heel end of the shoe, arms connected respectively to the opposite ends of said band and mounted for swinging movements toward each other about axes extending lengthwise of the shoe in response to pressure of the shoe on the band, and spring means against the resistance of which the arms are thus movable toward each other, the ends of the band being free to turn relatively to the arms about axes extending lengthwise of the shoe.

106. In a lasting machine, the combination with shoe-positioning means, of a flexible heel band for embracing the heel end of the shoe, rods arranged to extend lengthwise of the shoe and movable longitudinally to apply the band to the shoe, and arms connected respectively to the opposite ends of the band and mounted on said rods for swinging movements toward each other about the axes of the rods in response to pressure of the shoe on the band.

107. In a lasting machine, the combination with shoe-positioning means, of a flexible heel band for embracing the heel end of the shoe, rods arranged to extend lengthwise of the shoe and movable longitudinally to apply the band to the shoe, arms mounted on said rods for swinging movements laterally of the shoe about the axes of the rods and connected respectively to the opposite ends of the band, and springs arranged to swing said arms apart but yieldable to permit them to swing toward each other in response to pressure of the shoe on the band.

108. In a lasting machine, the combination with shoe-positioning means, of a flexible heel band for embracing the heel end of the shoe, arms mounted for swinging movements toward each other about axes extending lengthwise of the shoe in response to pressure of the shoe on the band, and members connected respectively to the opposite ends of the band and mounted on said arms to support the band, said members being adjustable relatively to the arms in paths curved heightwise of the shoe.

109. In a lasting machine, the combination with shoe-positioning means, of a heel rest for engaging the heel end of the shoe, a spring for moving said heel rest lengthwise of the shoe into shoe-engaging position, and automatic means for releasing the heel rest to the action of said spring and for later returning it to starting position, said automatic means including another spring through which the return of the heel rest is effected.

110. In a lasting machine, the combination with shoe-positioning means, of a heel rest for engaging the heel end of the shoe, and mechanism for moving said heel rest away from the shoe lengthwise of the latter, said mechanism including a spring yieldable to prevent injury to the operator if the operator is in the path of movement of the heel rest.

111. In a lasting machine, the combination with toe-lasting means, of a device movable to form a loop in an end portion of toe binder material and to present the looped end portion of the material in position to be removed from the device by the operator prior to its attachment to the shoe.

112. In a lasting machine, the combination with toe-lasting means, of an arm mounted for swinging movement, and a device carried by said arm for forming a loop in an end portion of toe binder material by the swinging of the arm and for presenting the looped end portion in position to be removed from the device by the operator prior to its attachment to the shoe.

113. In a lasting machine, the combination with toe-lasting means, of a device for forming a loop in an end portion of toe binder wire, said device having means to anchor the end of the wire and a pin about which to bend the wire, and means for moving the device to bend the wire about the pin and carry its anchored end across the body of the wire and to present the looped end portion of the wire in position to be removed from the device by the operator prior to its attachment to the shoe.

114. In a lasting machine, the combination with toe-lasting means, of a device for forming a loop in an end portion of toe binder wire, said device having means to anchor the end of the wire and a pin about which to bend the wire, and means for swinging said device bodily in an arc to bend the wire about the pin.

115. In a lasting machine, the combination with toe-lasting means of a device for forming a loop in an end portion of toe binder wire, said device having a slot to receive the end of the wire and a pin adjacent to the slot about which to bend the wire, and means for swinging said device bodily in an arc to bend the wire about the pin and to carry the portion in said slot across the body of the wire.

116. In a lasting machine, the combination with toe-lasting means, of an arm mounted to swing about an upwardly extending axis and extending upwardly in inclined relation to said axis, and a device on the upper end of said arm for forming a loop in an end portion of toe binder wire by the swinging of the arm.

117. In a lasting machine, the combination with toe-lasting means, and a support for a shoe at the top of the forepart, of a device mounted for swinging movement about said shoe support to form by that movement a loop in an end portion of toe binder wire preparatory to attachment of the wire to the shoe.

118. In a lasting machine, the combination with toe-lasting means, and a support for a shoe at the top of the forepart, of an arm mounted for swinging movement about said shoe support from one side thereof to the opposite side, and a device carried by said arm having means to receive an end portion of toe binder wire and to bend the wire to form a loop therein by the swinging of the arm.

119. In a lasting machine, the combination with toe-lasting means, of a support for a shoe at the top of the forepart movable heightwise of the shoe into operative position, a device movable to form a loop in an end portion of toe binder wire preparatory to attachment of the wire to the shoe, and means for operating said device by the movement of the shoe support.

120. In a lasting machine, the combination with toe-lasting means, of a toe rest for supporting the toe end of a shoe, a rod supporting said toe rest and movable heightwise of the shoe to carry the toe rest into operative position, a device mounted for swinging movement about said rod to form a loop in an end portion of toe binder wire, and means for thus swinging said device by the movement of the rod.

FRED C. EASTMAN.
ARTHUR F. PYM.